(12) United States Patent
Uchida

(10) Patent No.: US 9,986,180 B2
(45) Date of Patent: May 29, 2018

(54) IMAGE PICKUP APPARATUS AND METHOD FOR CONTROLLING IMAGE PICKUP APPARATUS

(71) Applicant: CANON KABUSHIKI KAISHA, Tokyo (JP)

(72) Inventor: Mineo Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/409,700

(22) Filed: Jan. 19, 2017

(65) Prior Publication Data
US 2017/0134673 A1    May 11, 2017

Related U.S. Application Data

(63) Continuation of application No. 14/742,306, filed on Jun. 17, 2015, now Pat. No. 9,602,741.

(30) Foreign Application Priority Data

Jun. 18, 2014  (JP) ................................ 2014-125494
May 21, 2015  (JP) ................................ 2015-103467

(51) Int. Cl.
*H04N 5/345* (2011.01)
*H04N 5/232* (2006.01)
(Continued)

(52) U.S. Cl.
CPC ......... *H04N 5/345* (2013.01); *H04N 5/23212* (2013.01); *H04N 5/23245* (2013.01); *H04N 5/3696* (2013.01); *H04N 5/378* (2013.01)

(58) Field of Classification Search
CPC .... H04N 5/345; H04N 5/347; H04N 5/23212; H04N 5/23245; H04N 5/378; H04N 5/3696; G02B 7/34
(Continued)

(56) References Cited

U.S. PATENT DOCUMENTS 8,159,580 B2 *  4/2012  Suzuki .............. H01L 27/14603
                                                    250/208.1
9,077,921 B2 *  7/2015  Hashimoto .......... H04N 5/3745
(Continued)

FOREIGN PATENT DOCUMENTS

CN           1925553 A      3/2007

OTHER PUBLICATIONS

The above foreign patent documents were cited in a Dec. 28, 2017 Chinese Office Action, which is enclosed with an English Translation, that issued in Chinese Patent Application No. 201510334005.2.

*Primary Examiner* — Lin Ye
*Assistant Examiner* — Marly Camargo
(74) *Attorney, Agent, or Firm* — Cowan, Liebowitz & Latman, P.C.

(57) ABSTRACT

An image pickup apparatus including are, image pickup nit configured to employ a first mode and a second mode, and a controller configured to read out, in the first mode, a first row, and read out, in the second mode and a mode different from the second mode, a second row, the first row being read out in the first mode during a first read-out period, the second row being read out in the second mode during a second read-out period, the second row read out in the mode different from the second mode during a third read-out period, and the first to third read-out periods having the same length.

16 Claims, 17 Drawing Sheets

(51) Int. Cl.
  *H04N 5/378*  (2011.01)
  *H04N 5/369*  (2011.01)
  *H04N 5/347*  (2011.01)
  *G02B 7/34*   (2006.01)

(58) Field of Classification Search
  USPC .... 348/308, 301, 365, 345–353, 362, 221.1;
   396/114, 81, 121; 250/208.1
  See application file for complete search history.

(56) References Cited

U.S. PATENT DOCUMENTS

| | | | |
|---|---|---|---|
| 9,485,406 B2 * | 11/2016 | Sambonsugi | H04N 5/23212 |
| 9,602,741 B2 * | 3/2017 | Uchida | H04N 5/345 |
| 2013/0141621 A1 | 6/2013 | Ishii | |
| 2013/0242173 A1 * | 9/2013 | Kadohara | H04N 5/23212 |
| | | | 348/349 |
| 2014/0285705 A1 * | 9/2014 | Uchida | H04N 5/23212 |
| | | | 348/345 |
| 2014/0285706 A1 * | 9/2014 | Theuwissen | H04N 5/23212 |
| | | | 348/350 |

* cited by examiner

IN CASE OF OUT-OF-FOCUS STATE

SUBSTANTIALLY IN-FOCUS STATE

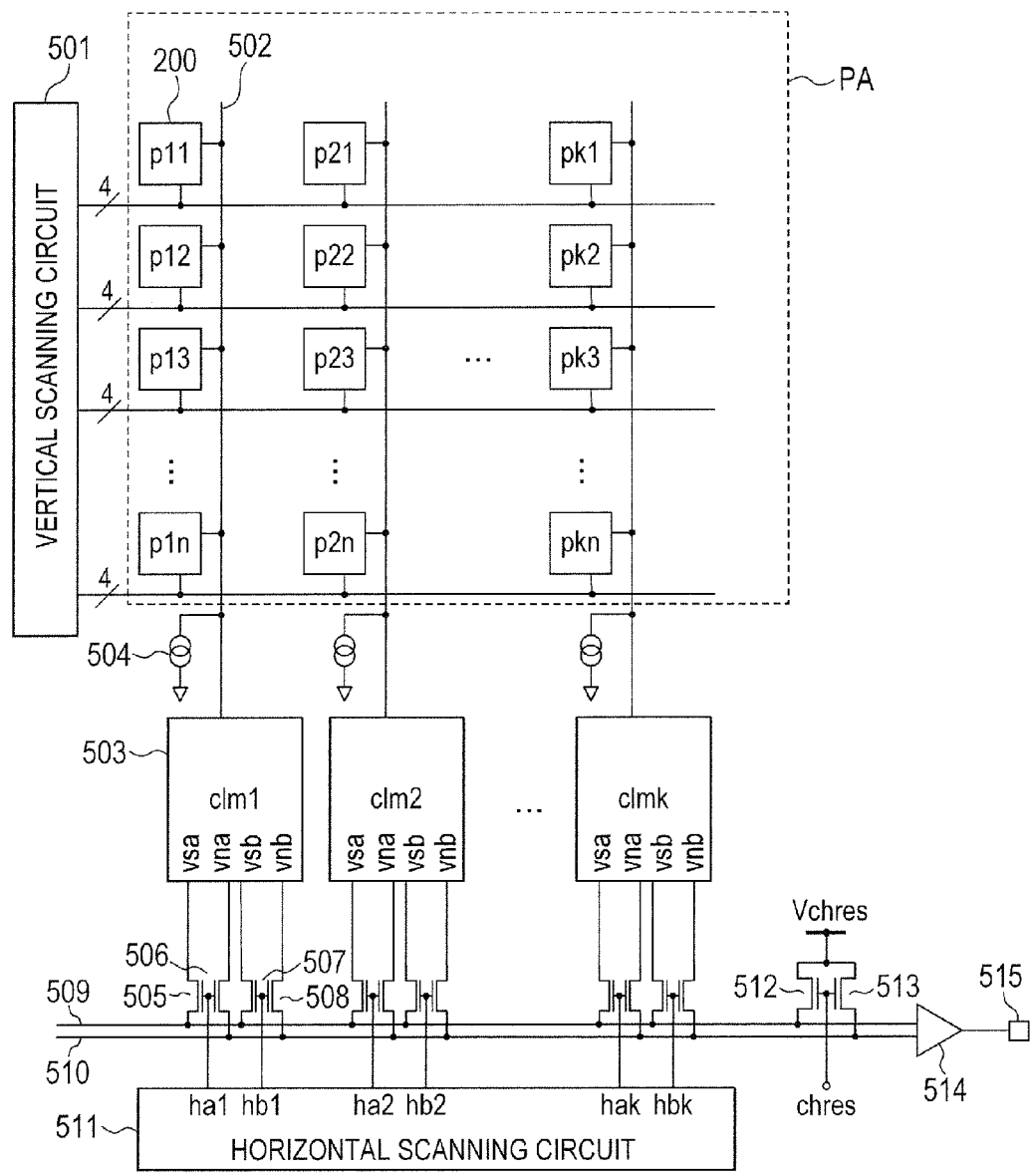

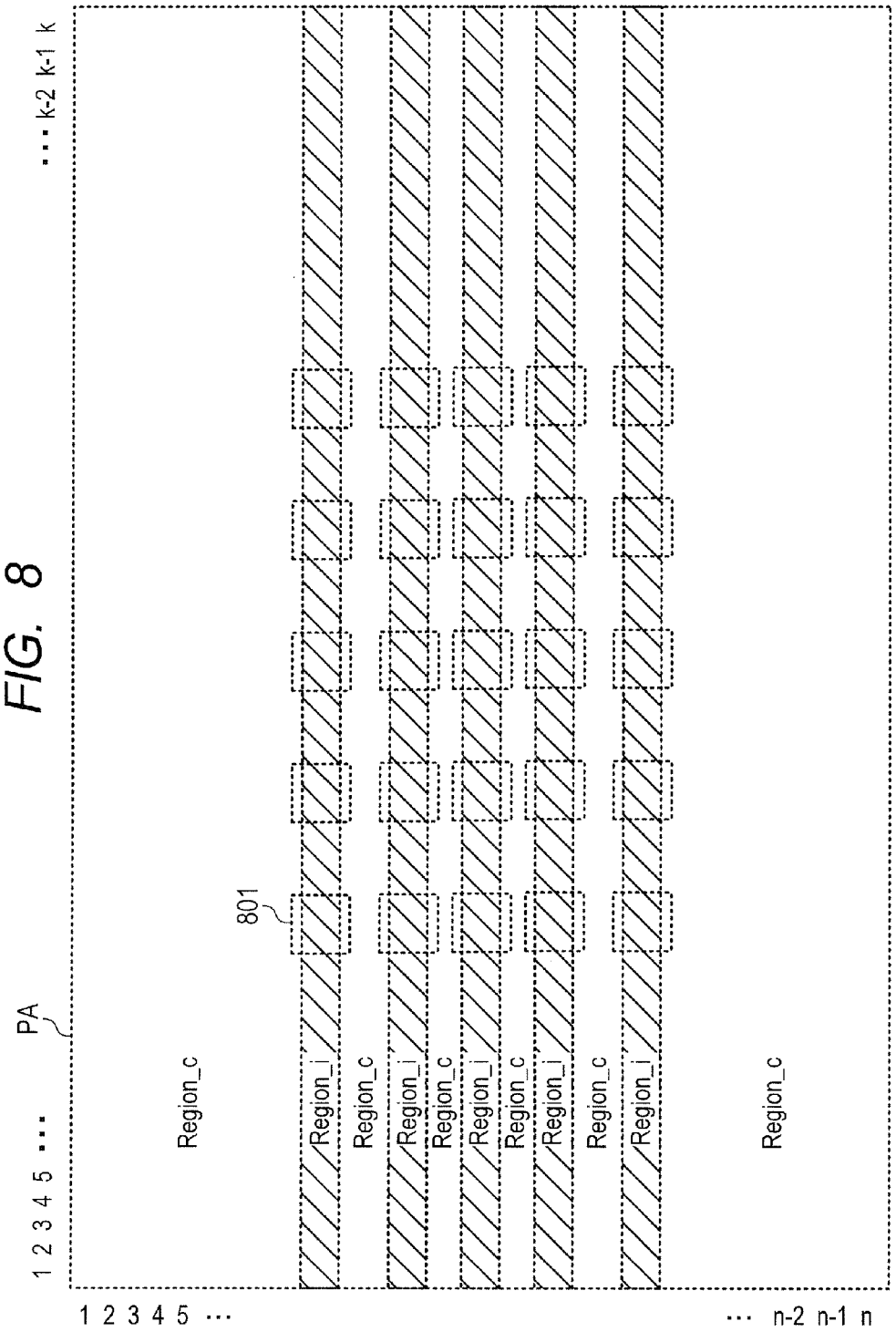

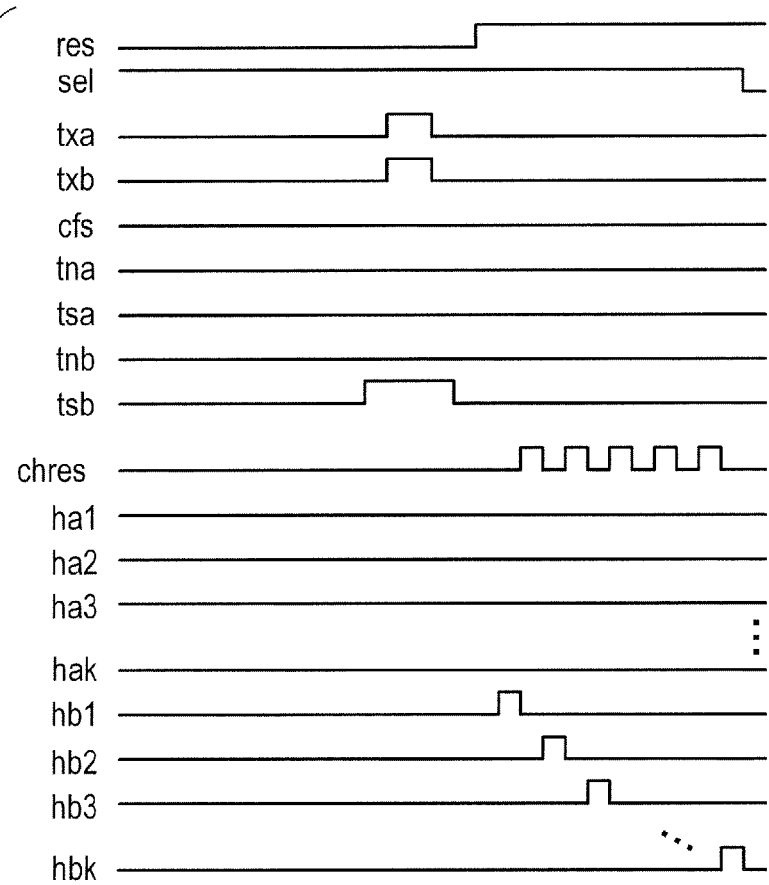

IMAGE PICKUP APPARATUS AND METHOD FOR CONTROLLING IMAGE PICKUP APPARATUS

CROSS-REFERENCE TO RELATED APPLICATION

This application is a continuation of application Ser. No. 14/742,306, filed Jun. 17, 2015, the entire disclosure of which is hereby incorporated by reference.

BACKGROUND OF THE INVENTION

Field of the Invention

The present invention relates to an image pickup apparatus and a method for controlling the image pickup apparatus.

Description of the Related Art

In recent years, an image pickup apparatus using an image pickup element such as a CMOS sensor has become multi-functional. Not only generation of acquired images such as still and moving images, but also control of the image pickup apparatus such as focusing has been carried out based on object information obtained by the image pickup element.

For example, in Japanese Patent Application Laid-Open No. 2001-124984, there is disclosed such a technology that signals obtained from the image pickup element are used to enable focus detection in a pupil division system. In Japanese Patent Application Laid-Open. No. 2001-124984, each pixel of the image pickup element includes one microlens and two photodiodes so that the photodiodes respectively receive light passing through different pupils of an image pickup lens. Output signals from those two photodiodes are compared with each other to enable focus detection, and the output signals from those two photodiodes are added to each other to enable generation of an acquired image.

SUMMARY OF THE INVENTION

According to one aspect of the embodiment, an image pickup apparatus, including: an image pickup unit including: a plurality of microlenses arrayed in a row direction and a column direction; and a pixel region including a plurality of unit pixels arrayed in the row direction and the column direction so as to correspond to the plurality of microlenses, respectively, the plurality of unit pixels each including a first photoelectric converter and a second photoelectric converter, the image pickup unit being configured to employ at least: a first mode that is a mode in which signal corresponding to charges generated in the first photoelectric converter and the second photoelectric converter is subjected to synthesis processing, and the signal subjected to the synthesis processing is read out; and a second mode that is a mode in which a signal corresponding to the charges generated in the first photoelectric converter is read out without the synthesis processing; and a controller configured to read out, in the first mode, a first row positioned in a first region of the pixel region, and read out, in the second mode and a mode different from the second mode, a second row positioned in a second region of the pixel region, which is different from the first region, the first row positioned in the first region being read out in the first mode during a first read-out period, the second row positioned in the second region being read out in the second mode during a second read-out period different from the first read-out period, the second row positioned in the second region being read out in the mode different from the second mode during a third read-out period different from both of the first read-out period and the second read-out period, the first read-out period, the second read-out period, and the third read-out period having the same length when an image is acquired.

Further features of the present invention will become apparent from the following description of exemplary embodiments with reference to the attached drawings.

BRIEF DESCRIPTION OF THE DRAWINGS

FIG. 5 is an overall configuration diagram of the image pickup element according to the first embodiment of the present invention.

FIG. 8 is a view for illustrating focusing frames set for a pixel array of the image pickup element according to the first embodiment of the present invention.

FIGS. 9A, 9B and 9C are timing charts of a read-out operation of the unit pixel row of the image pickup element in the image pickup apparatus according to the first embodiment of the present invention.

DESCRIPTION OF THE EMBODIMENTS

When each pixel includes a plurality of photodiodes as in Japanese Patent Application Laid-Open No. 2001-124984, a long time period is required to read out signals of all pixels.

In view of this, in a pixel row to be used for focus detection processing, a signal is read out independently from each photodiode of each pixel, whereas in a pixel area not to be subjected to the focus detection processing, the signals of the photodiodes are added in each pixel to read out only a signal for image generation. With this, the increase in read-out time can be suppressed.

However, in this case, the time required for read-out is different between the pixel row used for focus detection and other pixel rows. Therefore, in a slit rolling operation, which is general as an operation during live view or moving image acquisition, there is caused such a phenomenon that accumulation time differs among the pixel rows to cause different exposure amounts (hereinafter referred to as "exposure amount difference").

Exemplary embodiments of the present invention are hereinafter described in detail with reference to the attached drawings.

First Embodiment

Figure 1:
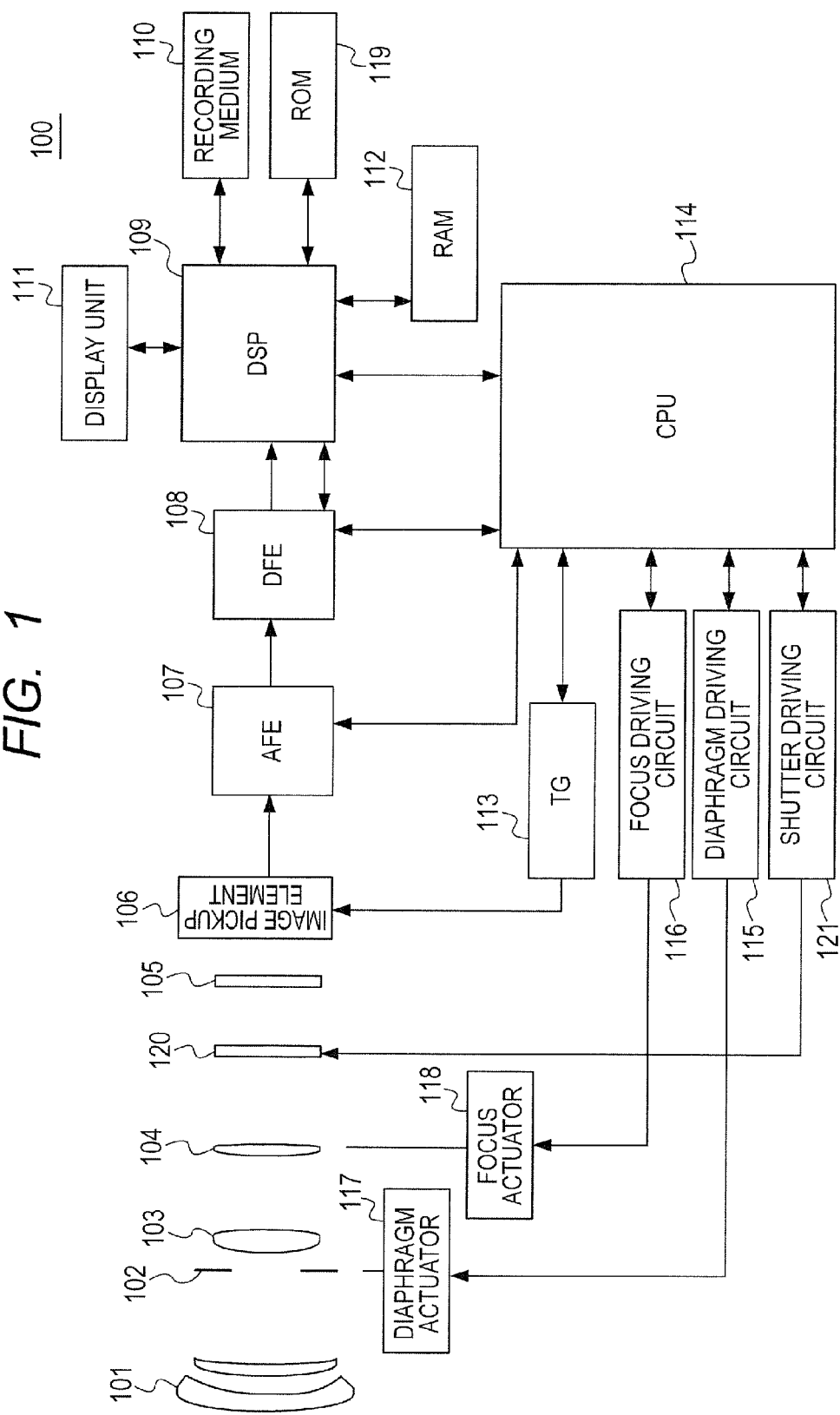
FIG. 1 is an overall configuration diagram of an image pickup apparatus according to a first embodiment of the present invention.

An image pickup apparatus according to a first embodiment of the present invention is described with reference to the drawings. FIG. 1 is an overall configuration diagram of an image pickup apparatus 100 according to this embodiment.

As illustrated in FIG. 1, a first lens group 101 arranged at a leading end of an image pickup optical system is held to be advanceable and retreatable in an optical axis direction. A diaphragm 102 adjusts the light amount during image pickup by adjusting its aperture diameter. A second lens group 103 carries out a magnification action (zooming function) in conjunction with an advancing and retreating operation of the first lens group 101. A third lens group 104 carries out focusing through an advancing and retreating movement in the optical axis direction.

An optical low-pass filter 105 is an optical element for reducing false color and moire in the acquired image. An image pickup element (image pickup unit) 106 generates an image pickup signal (pixel signal) by photoelectrically converting (image pickup) an object image imaged by the lens groups 101, 103, and 104. In this case, a CMOS image sensor in a Bayer array is used as the image pickup element 106.

An analog image signal output from the image pickup element 106 is converted into a digital signal (image data) by an analog front end (AFE) 107, and the digital signal is input to a digital front end (DFE) 108 to be subjected to predetermined calculation processing. A digital signal processor (DSP) 109 carries out correction processing, developing processing, or the like on the image data output from the DFE 108. Further, the DSP 109 also carries out automatic focus (AF) calculation for calculating the out-of-focus amount from the image data.

The image data is recorded on a recording medium 110. A display unit 111 is configured to display the acquired images, various menu screens, and the like, and a liquid crystal display (LCD) or the like is used therefor.

A RAM 112 is configured to temporarily store the image data and the like, and is connected to the DSP 109. A timing generator (TG) 113 supplies a drive signal to the image pickup element 106.

A CPU (controller, control unit) 114 carries out control of the AFE 107, the DFE 108, the DSP 109, the TG 113, and a diaphragm driving circuit 115. Further the CPU 114 controls a focus driving circuit 116 based on the AF calculation result of the DSP 109. Those controls carried out by the CPU 114 are realized by the CPU 114 executing read-out of a control program stored in a ROM 119 or a memory (not shown).

The diaphragm driving circuit 115 controls the drive of a diaphragm actuator 117 to drive the diaphragm 102. The focus driving circuit 116 controls the drive of a focus actuator 118 to move forward and backward the third lens group 104 in the optical axis direction. With this, focusing is carried out. The ROM 119 stores various correction data and the like. A mechanical shutter 120 controls the exposure amount to the image pickup element 106 during still image acquisition. The mechanical shutter 120 keeps an open state during a live view operation or moving image acquisition, which corresponds to a state in which the image pickup element 106 is continuously exposed with light. A shutter driving circuit 121 controls the mechanical shutter 120.

Figure 2:
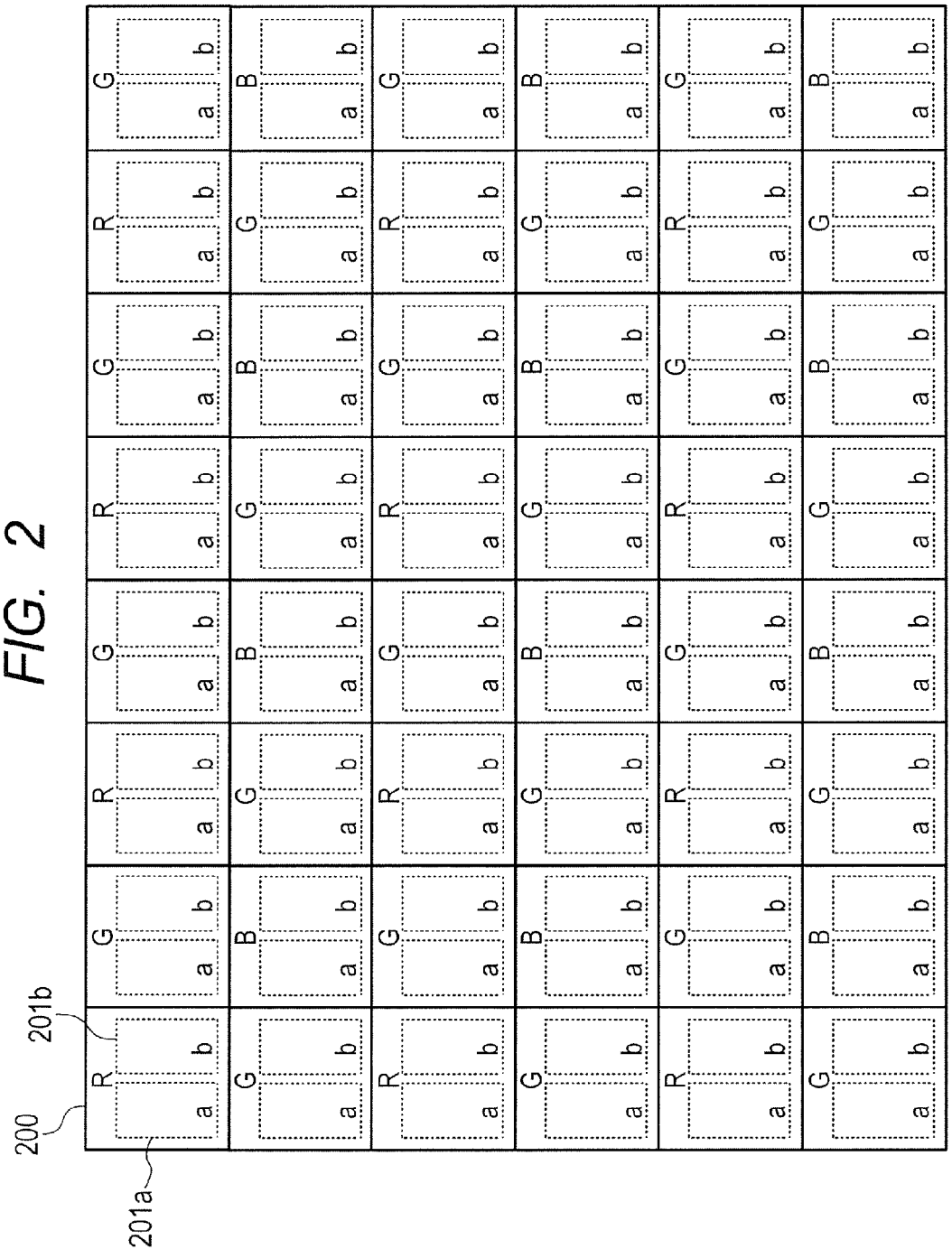
FIG. 2 is a schematic view for illustrating a pixel arrangement of an image pickup element according to the first embodiment of the present invention.

FIG. 2 is a schematic view for illustrating a pixel arrangement of the image pickup element 106. As illustrated in FIG. 2, unit pixels 200 are arrayed in a row-column pattern (two dimensionally), that is, in a matrix pattern, and color filters of red (R), green (G), and blue (B) are arranged in a Bayer pattern for the respective unit pixels 200. Further, a sub-pixel a and a sub-pixel b are arranged in each of the unit pixels 200, and photodiodes (hereinafter each referred to as "PD") 201a and 201b are arranged in the sub-pixels a and b, respectively. The respective image pickup signals output from the sub-pixels a and b are used for focus detection, and an a/b synthesized signal, which is a signal obtained by adding image pickup signals respectively output from the sub-pixel a and the sub-pixel b, is used for image generation.

Figure 3:
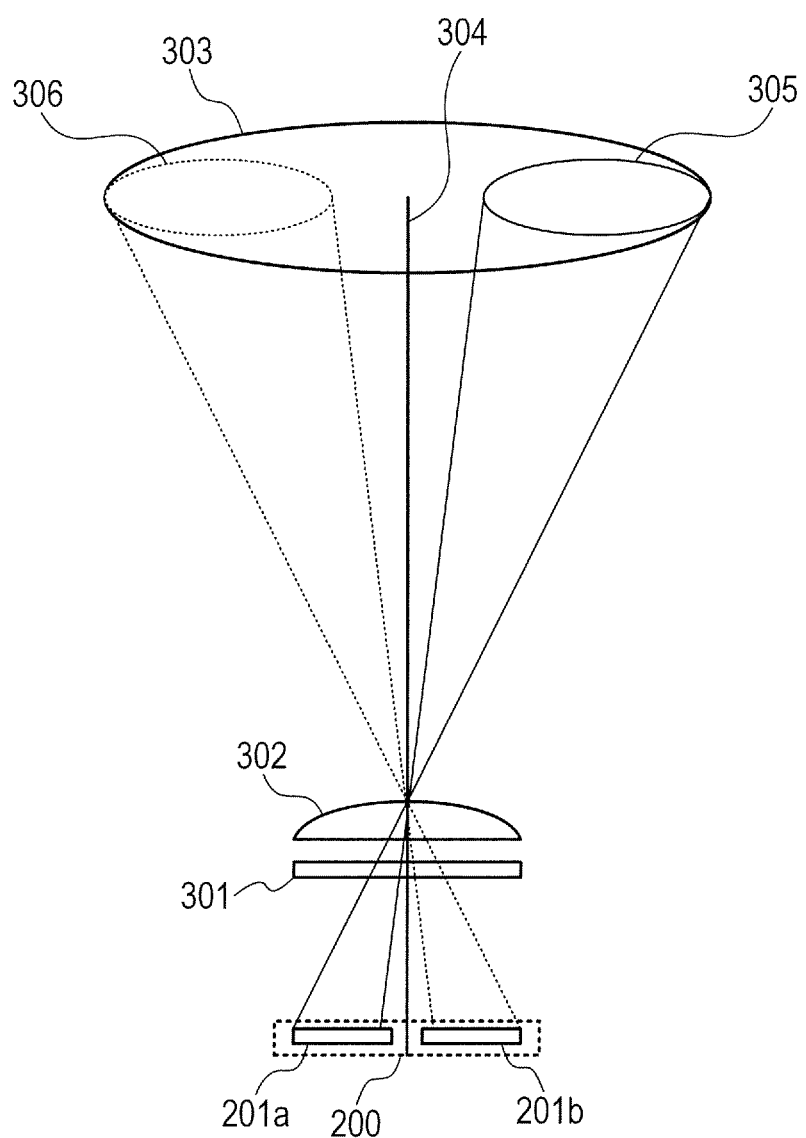
FIG. 3 is a schematic view for illustrating a relationship between a pixel and a light flux that exits from an exit pupil of an image pickup lens.

FIG. 3 is a schematic view for illustrating a relationship between the unit pixel 200 and a light flux that exits from an exit pupil of an image pickup lens including the first to third lens groups 101, 103 and 104 and the diaphragm 102. In FIG. 3, similar parts as those in FIG. 2 are denoted by the same reference symbols.

As illustrated in FIG. 3, a color filter 301 and a microlens 302 are formed above each unit pixel 200. Light that has passed through an exit pupil 303 of the image pickup lens enters the unit pixel 200 with an optical axis 304 as a center. A light flux that passes through a pupil region 305, which is a partial region of the exit pupil 303 of the image pickup lens, passes through the microlens 302 to be received at the sub-pixel a. On the other hand, a light flux that passes through a pupil region 306, which is another partial region of the exit pupil 303, passes through the microlens 302 to be received at the sub-pixel b. Therefore, the sub-pixel a and the sub-pixel b respectively receive light of different pupil regions 305 and 306 of the exit pupil 303 of the image pickup lens. Therefore, by comparing the output signals of the sub-pixel a and the sub-pixel b with each other, focus detection in a phase difference system is possible.

Figure 4A:
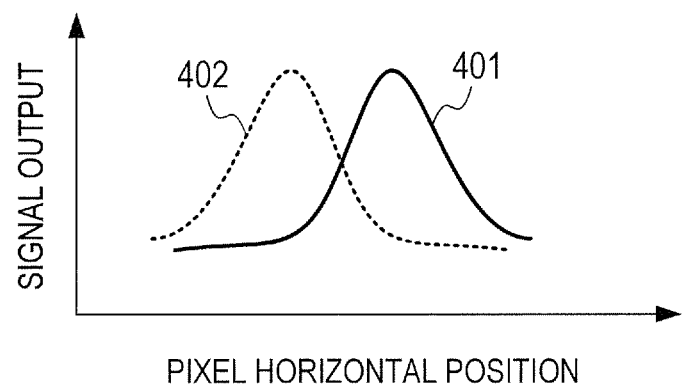
FIGS. 4A and 4B are graphs for showing a correlation between a focusing state and an image signal.
Figure 4B:
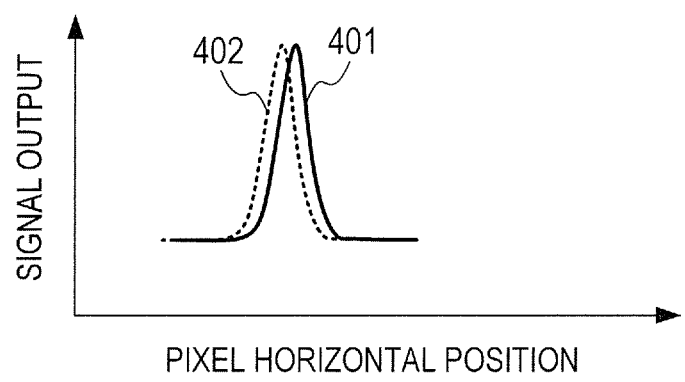

FIG. 4A and FIG. 4B are graphs for showing, in different focal states, a correlation between an image signal waveform 401 obtained from the sub-pixel a and an image signal waveform 402 obtained from the sub-pixel b. As shown in FIG. 4A, in a case of an out-of-focus state, the image signal waveforms 401 and 402 obtained from the respective sub-pixels a and b do not match with each other, and are significantly misaligned from each other. As approaching to the in-focus state, as shown in FIG. 4B, the misalignment between the image signal waveforms 401 and 402 is reduced, and the image signal waveforms 401 and 402 overlap with each other in the in-focus state. As described above, the out-of-focus amount (defocus amount) is detected based on the misalignment amount between the image signal waveforms 401 and 402 obtained from the respective sub-pixels a and b, to thereby carry out focusing.

Figure 6:
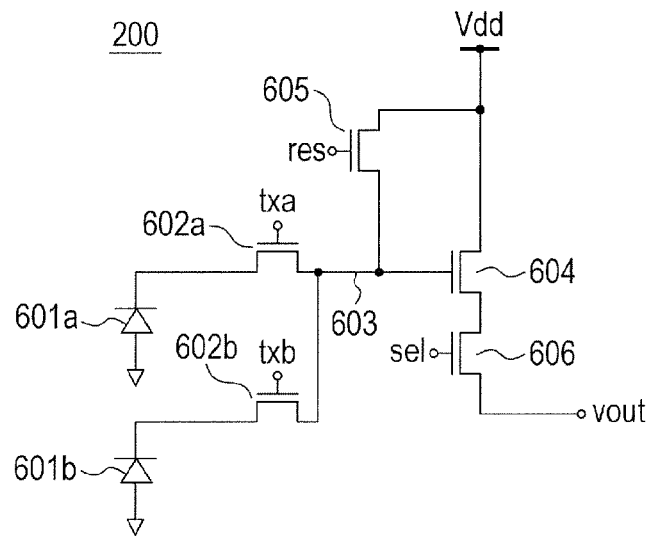
FIG. 6 is a diagram for illustrating a circuit configuration of a unit pixel of the image pickup element according to the first embodiment of the present invention.

FIG. 5 is an overall configuration diagram of the image pickup element 106. A pixel region PA includes the unit pixels 200 arranged in a row-column pattern (n rows×k columns), that is, in a matrix pattern as denoted by p11 to pkn. Now, the configuration of the unit pixel 200 is described with reference to FIG. 6. FIG. 6 is a diagram for illustrating a circuit configuration of the unit pixel of the image pickup element.

In FIG. 6, optical signals that have entered the PDs (photoelectric converters) 601a and 601b of the respective sub-pixels a and b described above are photoelectrically converted by the PDs 601a and 601b, and charges corresponding to the exposure amounts are accumulated in the PDs 601a and 601b. Signals txa and txb to be applied to gates of transfer gates 602a and 602b are respectively set to High level, to thereby transfer charges accumulated in the PDs 601a and 601b to a floating diffusion (FD) portion 603. The FD portion 603 is connected to a gate of a floating diffusion amplifier 604 (hereinafter referred to as "FD amplifier"), and the amounts of charges transferred from the PDs 601a and 601b are converted into voltage amounts by the FD amplifier 604, By setting a signal res, which be applied to a gate of an FD reset switch 605 for resetting the FD portion 603, to High level, the FD portion 603 is reset. Further, when the charges of the PDs 601a and 601b are reset, the signal res and the and the signals txa and txb are simultaneously set to High level. With this, all of the transfer gates 602a and 602b and the FD reset switch 605 are turned on to reset the PDs 601a and 601b via the FD portion 603. By setting a signal sel to be applied to a gate of a pixel selection switch 606 to High level, a pixel signal converted into a voltage by the FD amplifier 604 is output to an output vout of the unit pixel 200.

As illustrated in FIG. 5, a vertical scanning circuit 501 supplies, to the respective unit pixels 200, drive signals such as res, txa, txb, and sel for controlling the respective switches of the unit pixel 200 described above. Those drive signals res, txa, txb, and sel are supplied in common for each row. The outputs vout of the respective unit pixels 200 are connected to a column common read-out circuit 503 via a vertical output line 502 for each column.

Now, the configuration of the column common read-out circuit 503 is described with reference to FIG. 7.

The vertical output line 502 is arranged for each column of the unit pixels 200, and is connected to the outputs vout of the unit pixels 200 in one column. The vertical output line 502 is connected to a current source 504. The current source 504 and the FD amplifier 604 of the unit pixel 200 connected to the vertical output line 502 construct a source follower circuit.

Figure 7:
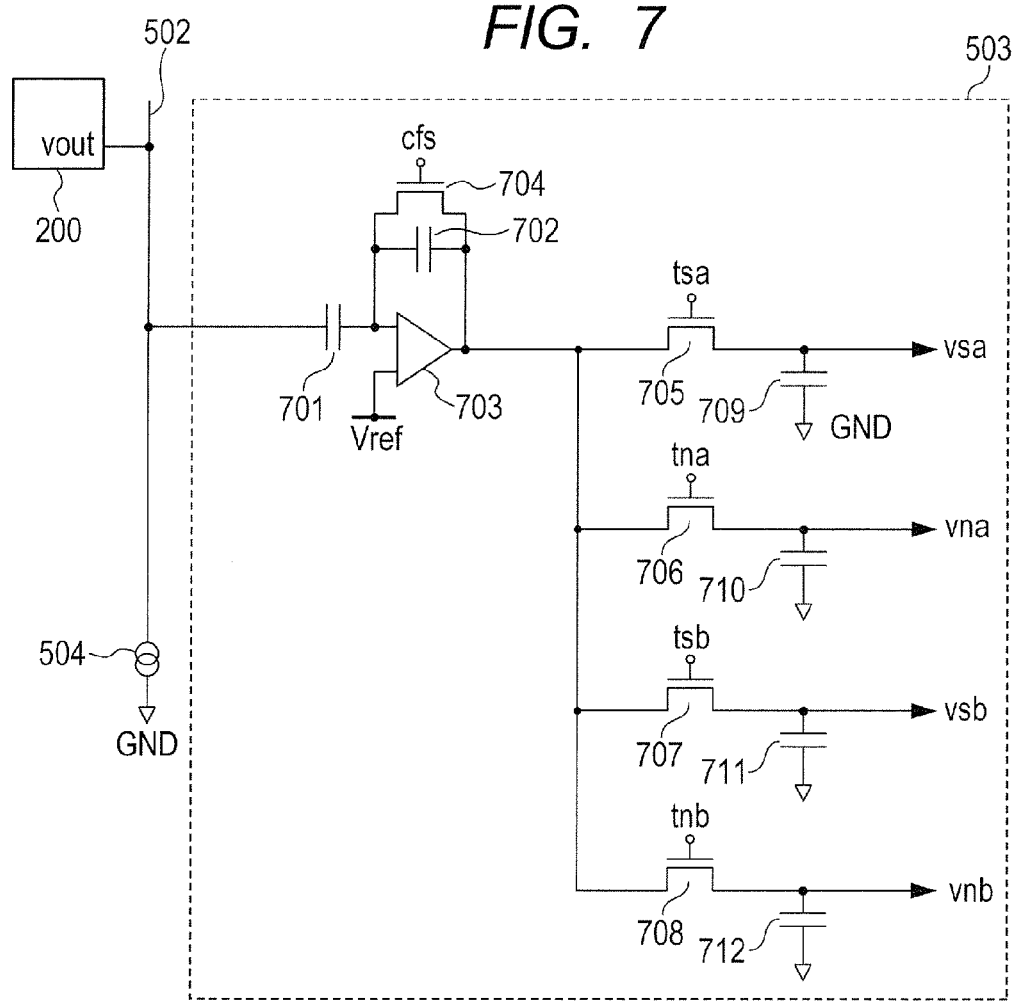
FIG. 7 is a view for illustrating a configuration of a read-out circuit for each unit pixel column of the image pickup element according to the first embodiment of the present invention.

In FIG. 7, a clamp capacitor 701 has a capacitance of C1, and a feed-back capacitor 702 has a capacitance of C2. An operational amplifier 703 includes a non-inverting input terminal connected to a reference power supply Vref. A switch 704 is configured to short-circuit both ends of the feedback capacitor 702, and the switch 704 is controlled by a signal cfs.

Transfer switches 705 to 708 are configured to transfer respective signals read out from the unit pixels 200 to respective signal holding capacitors 709 to 712. With the read-out operation to be described later, the first S-signal holding capacitor 709 stores a pixel signal Sa output from the sub-pixel a. Further, the second S-signal holding capacitor 711 stores an a/b synthesized signal Sab, which is a signal obtained by synthesizing (adding) a signal output from the sub-pixel a and a signal output from the sub-pixel b to each other. Further, the first N-signal holding capacitor 710 and the second N-signal holding capacitor 712 respectively store noise signals N of the unit pixels 200. The signal holding capacitors 709 to 712 are connected to outputs vsa, vna, vsb, and vnb of the column common read-out circuit 503, respectively.

As illustrated in FIG. 5, horizontal transfer switches 505 and 506 are connected to the outputs vsa and vna of the column common read-out circuit 503, respectively. The horizontal transfer switches 505 and 506 are each controlled by an output signal ha* ("*" represents a column number) of a horizontal scanning circuit 511. When the signal ha* is set to High level, the signals of the first S-signal holding capacitor 709 and the first N-signal holding capacitor 710 are transferred to horizontal output lines 509 and 510, respectively.

Further, horizontal transfer switches 507 and 508 are connected to the outputs vsb and vnb of the column common read-out circuit 503, respectively. The horizontal transfer switches 507 and 508 are each controlled by an output signal hb* ("*" represents a column number) horizontal scanning circuit 511. When the signal hb* is set to High level, the signals of the second S-signal holding capacitor 711 and the second N-signal holding capacitor 712 are transferred to the horizontal output lines 509 and 510, respectively. The horizontal output lines 509 and 510 are connected to inputs of a differential amplifier 514. The differential amplifier 514 obtains a difference between the S signal and the N signal and simultaneously applies a predetermined gain, to thereby output a final output signal to an output terminal 515.

When a signal chres to be applied to gates of horizontal output line reset switches 512 and 513 is set to High, the horizontal output line reset switches 512 and 513 are turned on, and the respective horizontal output lines 509 and 510 are reset to a reset voltage Vchres.

Now, a read-out operation of an image signal A and a read-out operation of an image signal AB, which is a synthesized signal of the image signal A and an image signal B, are described.

FIG. 8 is a view for illustrating a relationship between the pixel region PA of the image pickup element 106 and focusing frames 801 set in the pixel region PA to carry out focus detection. The focusing frame 801 is set by the CPU 114 to the DSP 109, and is controlled by generating the drive signal by the TG 113. The focusing frame 801 is set in accordance with setting data stored in the ROM 119 in advance, but the focusing frame 801 may be set in accordance with data input by the user through operation of an operating member (not shown).

In the pixel region PA including pixels of k columns and n rows as described above, the focusing frame 801 is indicated by the dotted line. In this embodiment, the image signal A and the image signal AB are read out from the rows of the unit pixels included in regions Region_i represented as shaded parts, which are used for image generation and focus detection calculation. From rows of the unit pixels included in regions Region_c that are regions other than the regions Region_i, only the image signal AB is read out, which is used not for focus detection calculation but only for image generation.

Note that, as illustrated in FIG. 8, when a plurality of regions Region_i are set in the vertical direction of the pixel region, the number of rows of the unit pixels 200 in each region Region_i may be set different among the plurality of regions Region_i.

Figure 9A:
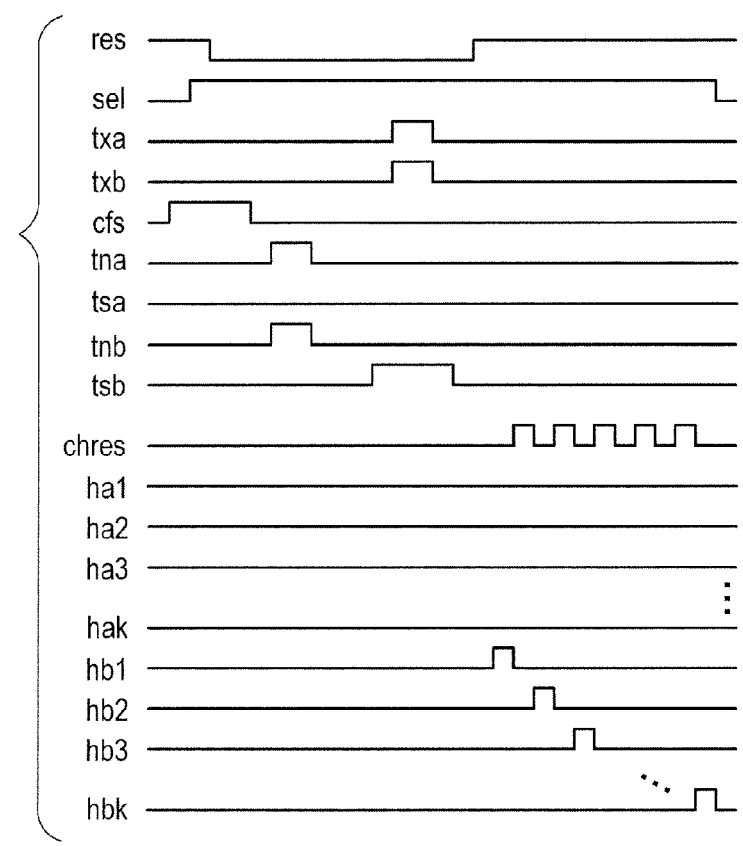
Figure 9B:
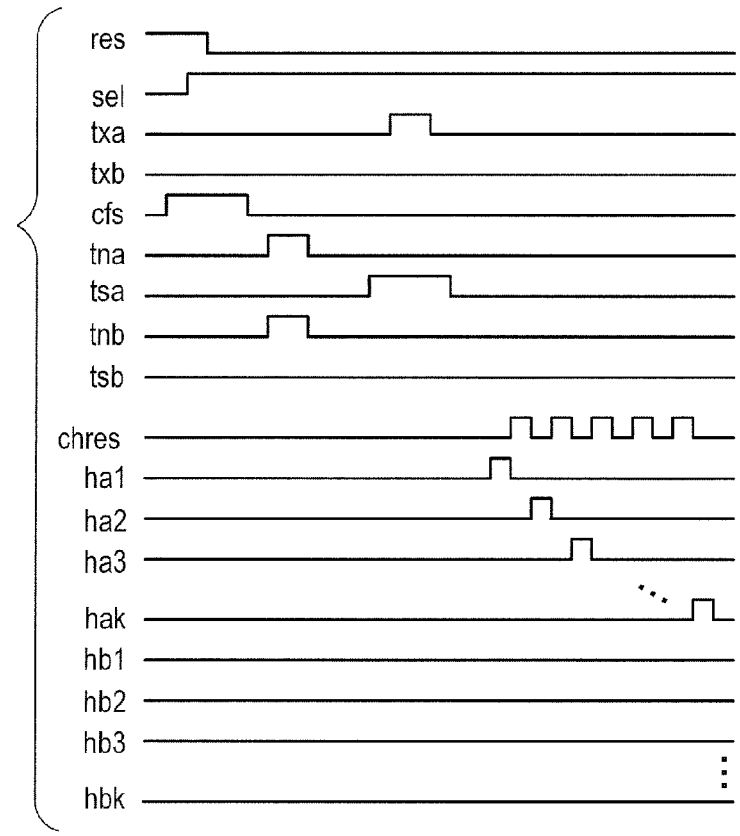

Next, the read out operation of the image pickup element 106 is described with reference to FIG. 9A to FIG. 9C. FIG. 9A is a timing chart of the read-out operation carried out for each row of the region Region_c described above.

First, the signal cfs is set to High level to turn on the switch 704, to thereby set the operational amplifier 703 to a buffer state. Next, the signal sel is set to High level to turn on the pixel selection switch 606 of the unit pixel. After that, the signal res is set to Low level to turn off the FD reset switch 605, to thereby open the reset of the FD position 603.

Subsequently, the signal cfs is returned to Low level to turn off the switch 704, and then the signals tna and tnb are set to High level so that the first N-signal holding capacitor 710 and the second N-signal holding capacitor 712 store the noise signals N via the transfer switches 706 and 708, respectively.

Next, the signals tna and tnb are set to Low, and the transfer switches 706 and 708 are turned off. After that, the signal tsb is set to High level to turn on the transfer switch 707, and the signals txa and txb are set to High level to turn on the transfer gates 602a and 602b. With this operation, a signal obtained by synthesizing the charge signal accumulated in the PD 601a of the sub-pixel a and the charge signal accumulated in the PD 601b of the sub-pixel b is output to the vertical output line 502 via the FD amplifier 604 and the pixel selection switch 606. In the operational amplifier 703, the signal of the vertical output line 502 is amplified with a gain corresponding a capacitance ratio between the capacitance C1 of the clamp capacitor 701 and the capacitance C2 of the feedback capacitor 702, and the amplified signal is stored in the second S-signal holding capacitor 711 via the transfer switch 707 (a/b synthesized signal Sab). The transfer gates 602a and 602b and the transfer switch 707 are sequentially turned off, and then the signal res is set to High level to turn on the FD reset switch 605, to thereby reset the FD portion 603.

Next, the output hb1 of the horizontal scanning circuit 511 is set to High level, to thereby turn on the horizontal transfer switches 507 and 508. With this, the signals the second S-signal holding capacitor 711 and the second N-signal holding capacitor 712 are output to the output terminal 515 via the horizontal output lines 509 and 510 and the differential amplifier 514. The horizontal scanning circuit 511 sequentially sets the selection signals hb1, hb2, . . . , hbk of each column to High, to thereby output the a/b synthesized signal (image signal AB) for one row. Note that, while the signals of the respective columns are read out by the signals hb1 to hbk, the signal chres is set to High level to turn on the horizontal output line reset switches 512 and 513, and the horizontal output lines 509 and 510 are once reset to a level of the reset voltage Vchres.

The above is the read-out operation of each row of the unit pixels in the region Region_c. With this, the image signal AB is read out.

Subsequently, the read-out operation of each row of the region Region_i is described with reference to FIG. 9B and FIG. 9C. FIG. 9B is a timing chart of an operation until the image signal A is read out. The operation starting from setting the signal cfs to High level until setting the signals tna and tnb to Low so that the first N-signal holding capacitor 710 and the second N-signal holding capacitor 712 store the N signals is similar to the operation described with reference to FIG. 9A.

After the storing of the noise signals N is ended, the signal tsa is set to High level to turn on the transfer switch 705, and the signal txa is set to High level to turn on the transfer gate 602a. With such an operation, the signal accumulated in the PD 601a of the sub-pixel a is output to the vertical output line 502 via the FD amplifier 604 and the pixel selection switch 606. In the operational amplifier 703, the signal of the vertical output line 502 is amplified with a gain corresponding to a capacitance ratio between the capacitance C1 of the clamp capacitor 701 and the capacitance C2 of the feedback capacitor 702, and the amplified signal is stored in the first S-signal holding capacitor 709 via the transfer switch 705 (pixel signal Sa).

Next, the output ha1 of the horizontal scanning circuit 511 is set to High level, to thereby turn on the horizontal transfer switches 505 and 506. With this, the signals of the first S-signal holding capacitor 709 and the first N-signal holding capacitor 710 are output to the output terminal 515 via the horizontal output lines 509 and 510 and the differential amplifier 514. The horizontal scanning circuit 511 sequentially sets the selection signals ha1, ha2, . . . , hak for the respective columns to High, to thereby output the signals of the sub-pixels a of one row (image signal A).

While maintaining the signal res to Low level and the signal sel to High level, the read-out of the image signal A is ended. With this, the image signal A on the FD portion 603 is held without being reset.

After the read-out of the image signal A is ended, the processing sequentially proceeds to the read-out operation of the image signal AB illustrated in FIG. 9C. The signal tsb is set to High level to turn on the transfer switch 707, and the signals txa and txb are set to High level to turn on the transfer gates 602a and 602b. With such an operation, the signal accumulated in the PD 602b of the sub-pixel b is added to the signal of the sub-pixel a held in portion 603, and the signal obtained by adding is output to the vertical output line 502 via the FD amplifier 604 and the pixel selection switch 606. The subsequent parts are the same as those in the operation of the region Region_c described with reference FIG. 9A.

With the operation above, the read-out operation of each row in the region Region_i is ended. With this, the image signal A and the image signal AB are sequentially read out.

By the way, as described above, in the region Region_i, the image signal A and the image signal AB are read out. Therefore, more time period is required as compared to the read-out of the image signal AB in the region Region_c, which may cause an exposure amount difference. In view of this, in the present invention, the length of the time, that is, the length of the read-out period (unit read-out period) required for each of the read-out operations in FIG. 9B and FIG. 9C is set to be the same as the length the time, that is, the length of the read-out period (unit read-out period) required for the read-out operation of FIG. 9A. In this case, the length of the readout time for one row of the region Region_c is set to, as a reference, the length of one unit read-out time (unit read-out period, unit period), and represented by 1H. Note that, "H" herein does not mean hour. The length of the read-out period in the read-out operation illustrated in FIG. 9A, the length of the read-out period in the read-out operation illustrated in FIG. 9B, and the length of the read-out period in the read-out operation illustrated in FIG. 9C are each set to 1H, that is, the length of one unit read-out period. When each row of the region Region_i is read out, the image signal A and the image signal AB are read out, and hence the read-out period in each row of the region Region_i is the length of two unit read-out periods, that is, 2H. When each row of the region Region_c is read out, only the image signal AB is read out, and hence the read-out period in each row of the region Region_c is the length of one unit read-out period, that is, 1H. That is, the read-out time of each row of the region Region_i is twice as large as the read-out time of each row of the region Region_c. With this, also in the slit rolling operation, an image without an exposure amount difference can be obtained.

Figure 10:
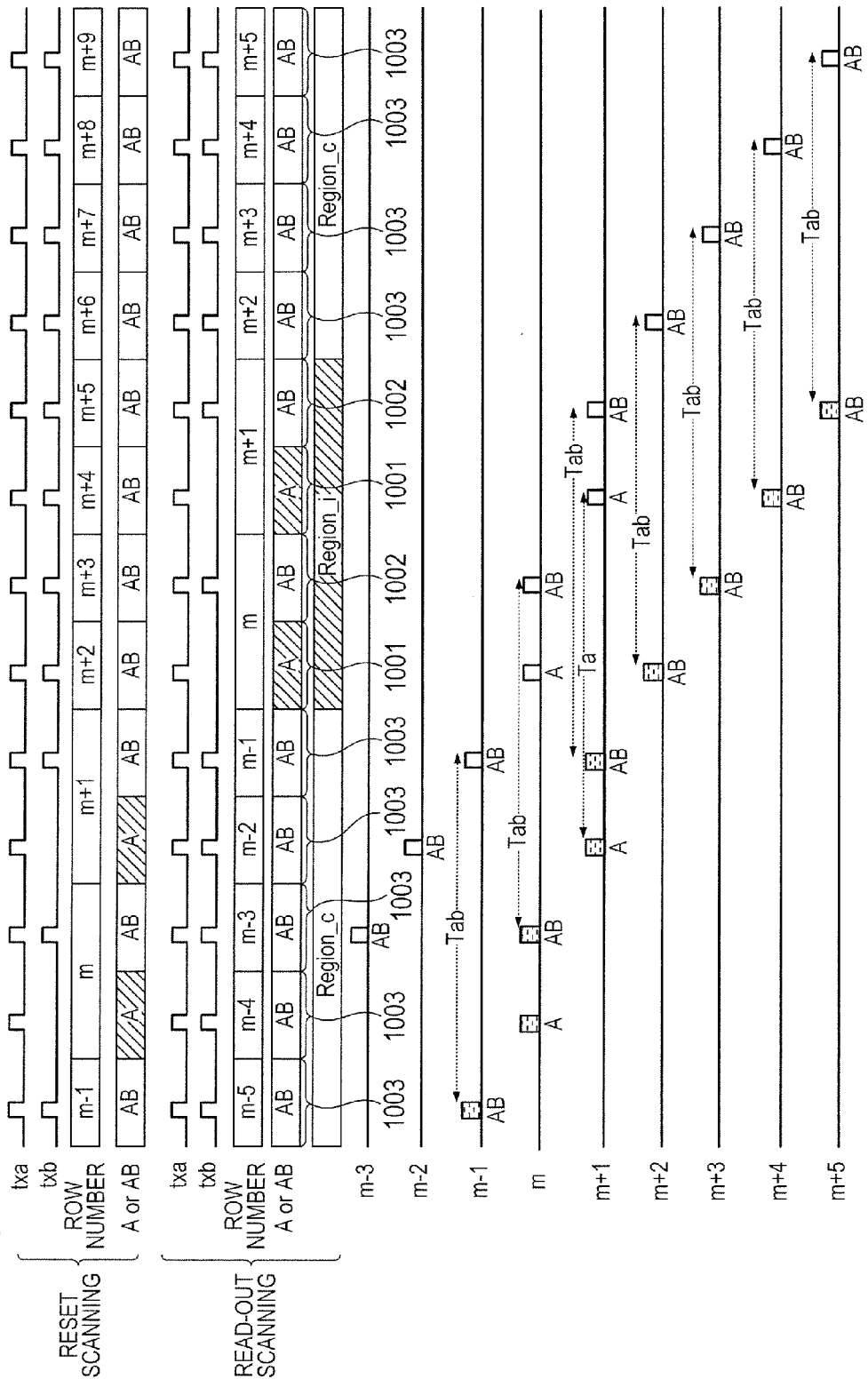
FIG. 10 is a timing chart of a slit rolling operation of the image pickup element in the image pickup apparatus according to the first embodiment of the present invention.

Now, with reference to FIG. 10, the slit rolling operation when the length of the read-out period in the region Region_i and the length of the read-out period in the region Region_c are set the same is described.

In the slit rolling operation, reset scanning is started first, and subsequently read-out scanning is carried out. With this, an image is acquired with a constant accumulation time in each row. FIG. 10 is an illustration of an example of an operation with an accumulation time Tab of 4H. Note that, as described above, 1H refers to a read-out time for one row of the region Region_c (unit read-out period, unit period).

As illustrated in FIG. 10, this operation is realized by causing the row number of the reset scanning to proceed four rows ahead of the row number of the read-out scanning. In the operation of each row, the dotted frame represents the reset of charges accumulated in the PD, and the white frame represents transfer (read-out) of the charges accumulated in the PD. In this case, the m-th row and the (m+1)th row are positioned in the region Region_i. The (m−5)th row to the (m−1)th row and the (m+2)th row to the (m+5)th row are positioned in the regions Region_c. The length of a read-out period 1001 of the image signal A in each of the m-th row and the (m+1)th row is 1H. Further, the length of a read-out period 1002 of the image signal AB in each of the m-th row and the (m+1)th row is 1H. The length of a read-out period 1003 of the image signal AB in each of the (m−5)th row to the (m−1)th row and the (m+2)th row to the (m+5)th row is 1H. It is understood that, by taking a time of 1H for each of the read-out of the image signal A and the read-out of the image signal AB in the region Region_i, a constant accumulation time Tab is maintained in both of the region Region_i and the region Region_c. For this, it is important to output the pulses of txa and txb at the same timing (in particular, set the falling edges at which the transfer gate is turned off at the same timing) in each H.

When the read-out is carried out for the unit pixels 200 positioned in the m-th row and the (m+1)th row, the image signal A is read out during the read-out period 1001, and the image signal AB is read out during the read-out period 1002. Therefore, during the read-out period 1001, the charges accumulated in the PD 601a are transferred to the FD portion 603, and during the read-out period 1002, the charges accumulated in the PD 601b are transferred to the FD portion 603.

Further, when the read-out is carried out for the unit pixels 200 positioned in the (m−5)th row to the (m−1)th row and the (m+2)th row to the (m+5)th row, the image signal AB is read out during each read-out period 1003. Therefore, during the read-out period 1003, the charges accumulated in the PD 601a and the charges accumulated in the PD 601b are transferred to the FD portion 603.

During the read-out period 1003, a first mode is applied, which is a mode in which the signals corresponding to the charges generated in the PD 601a and the PD 601b are subjected to synthesis processing, and the signals subjected to the synthesis processing are read out.

Further, during the read-out period 1001, a second mode is applied, which is a mode in which the signal corresponding to the charges generated in the PD 601a is read out without synthesis processing.

Further, during the read-out period 1002, a mode different from the second mode applied during the read-out period 1001 is applied. In this embodiment, the first erode is applied during the read-out period 1002, in which the signals corresponding to the charges generated in the PD 601a and the PD 601b are subjected to synthesis processing, and the signals subjected to the synthesis processing are read out.

In this case, the accumulation time Ta of the image signal A is a time Ta from resetting AB to transferring A, and hence is shorter by 1H than the accumulation time Tab of the image signal AB. Depending on the object or the like, this difference may cause accuracy deterioration in focus detection calculation in the DFE 108, the DSP 109, and the like. In such cases, correction may be carried out by multiplying a gain before focus detection calculation. For example, in the DFE 108, the image signal A may be multiplied by Tab/Ta to match the levels of the image signal AB and the image signal A.

Figure 11:
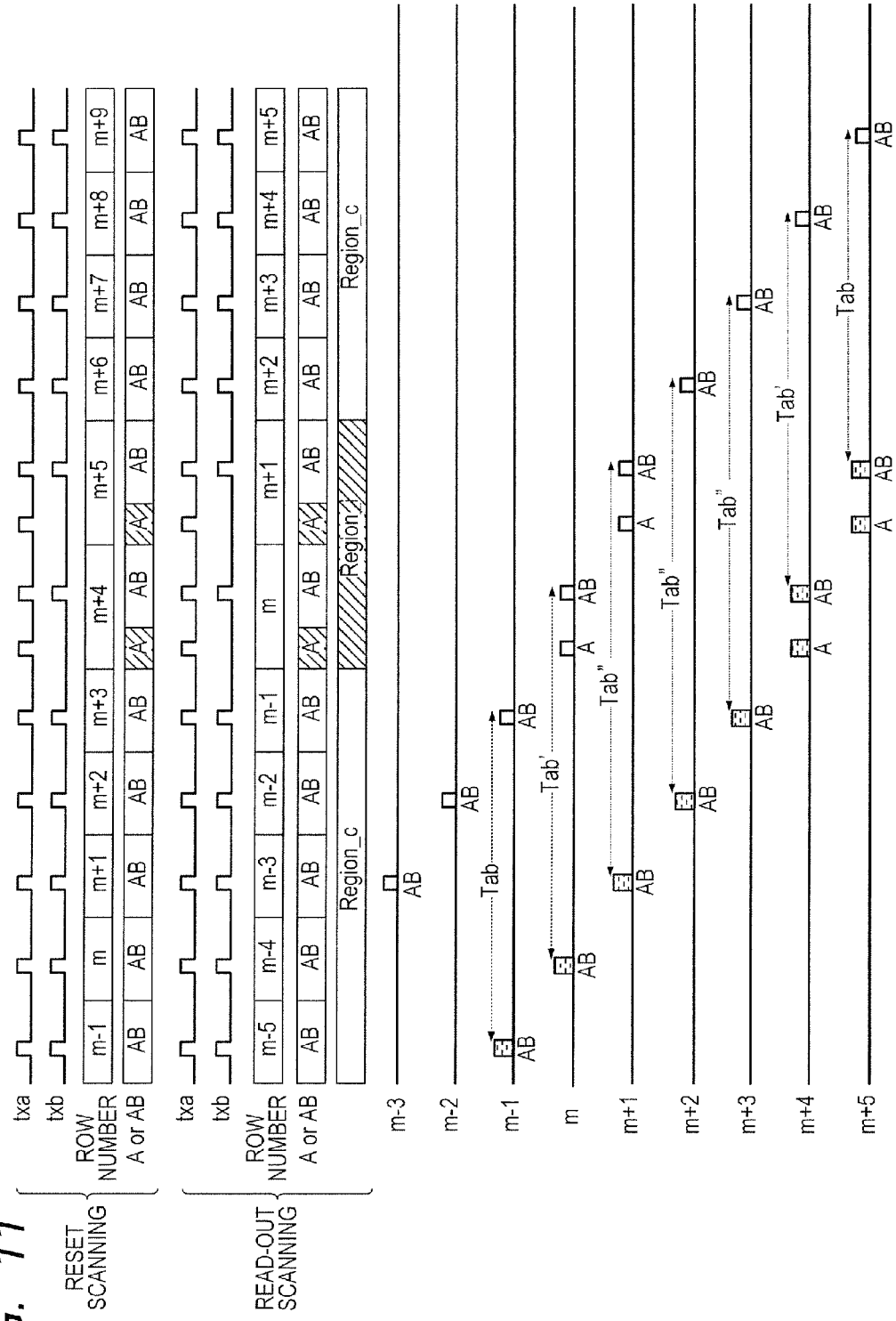
FIG. 11 is a timing chart of a slit rolling operation of a related-art image pickup element.
Figure 12:
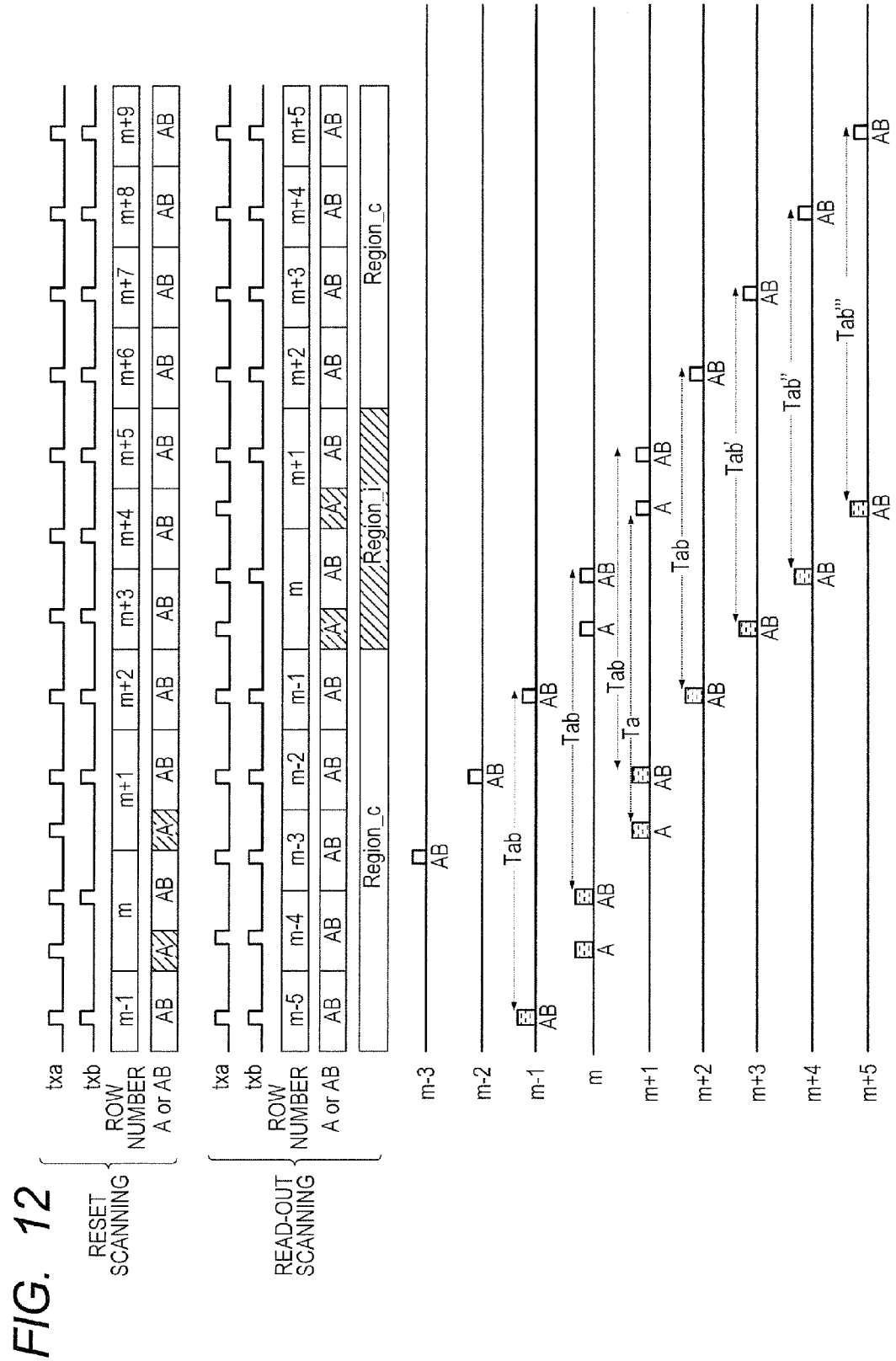
FIG. 12 is a timing chart of an inappropriate slit rolling operation.

Note that, as in the related art, in a case of a circuit in which the row number of the reset scanning and the row number of the read-out scanning simultaneously proceed, as illustrated in FIG. 11, the accumulation time differs as Tab, Tab', and Tab" depending on the row of the unit pixels, and hence the exposure amount difference occurs. The signal levels of the respective rows may be matched with each other through gain correction of the accumulation time difference in the DFE 108 and the DSP 109, but this gain correction is not desired because S/N may be uneven depending on the row, for example. Further, as illustrated in FIG. 12, even in the case of an operation similar to FIG. 10, when a time of 1H is not taken for read-out or reset of each of the image signal A and the image signal AB in the region Region_i, the accumulation time still differs depending on the row, which causes the exposure amount difference.

With the above-mentioned operation, the signals are read out from the image pickup element 106, to thereby generate an image from the image signals AB of the respective pixels in the DSP 109 and also carry out AF calculation with use of the image signals A and the image signals AB of the respective pixels in the regions Region_i. In this embodiment, the AF calculation is carried out for the respective focusing frames 801 at 5×5=25 positions illustrated in FIG. 8.

As described above, with the configuration of this embodiment, while suppressing the increase in read-out time due to acquisition of the signal for focus detection, an image with a satisfactory image quality with less exposure amount difference can be obtained.

Second Embodiment

An image pickup apparatus according to a second embodiment of the present invention is described with reference to FIG. 13. Similar components as those of the image pickup apparatus according to the first embodiment illustrated in FIG. 1 to FIG. 12 are denoted by the same reference symbols to omit or simplify the description.

In the first embodiment, as illustrated in FIG. 8, the AF calculation is carried out at 5×5 focusing frames 801 based on one frame information, and hence the regions Region_i are set at 5 positions (hereinafter such focusing mode is referred to as "large-number frame focusing mode"). In contrast, in this embodiment, an example in which the AF calculation carried out for one frame information is limited to shorten the signal read-out time of the image pickup element 106 is described. Note that, the configuration of the image pickup apparatus in this embodiment is similar to the configuration described with reference to FIG. 1 to FIG. 7 and FIG. 9A to FIG. 10 in the first embodiment, and hence description of the configuration similar to that in the first embodiment is omitted. The first embodiment and this embodiment differ in the setting of a focusing frame 1301 used for read-out of the image signal for focus detection (AF calculation) in each frame. Therefore, the setting of the focusing frame 1301 is mainly described herein.

Figure 13:
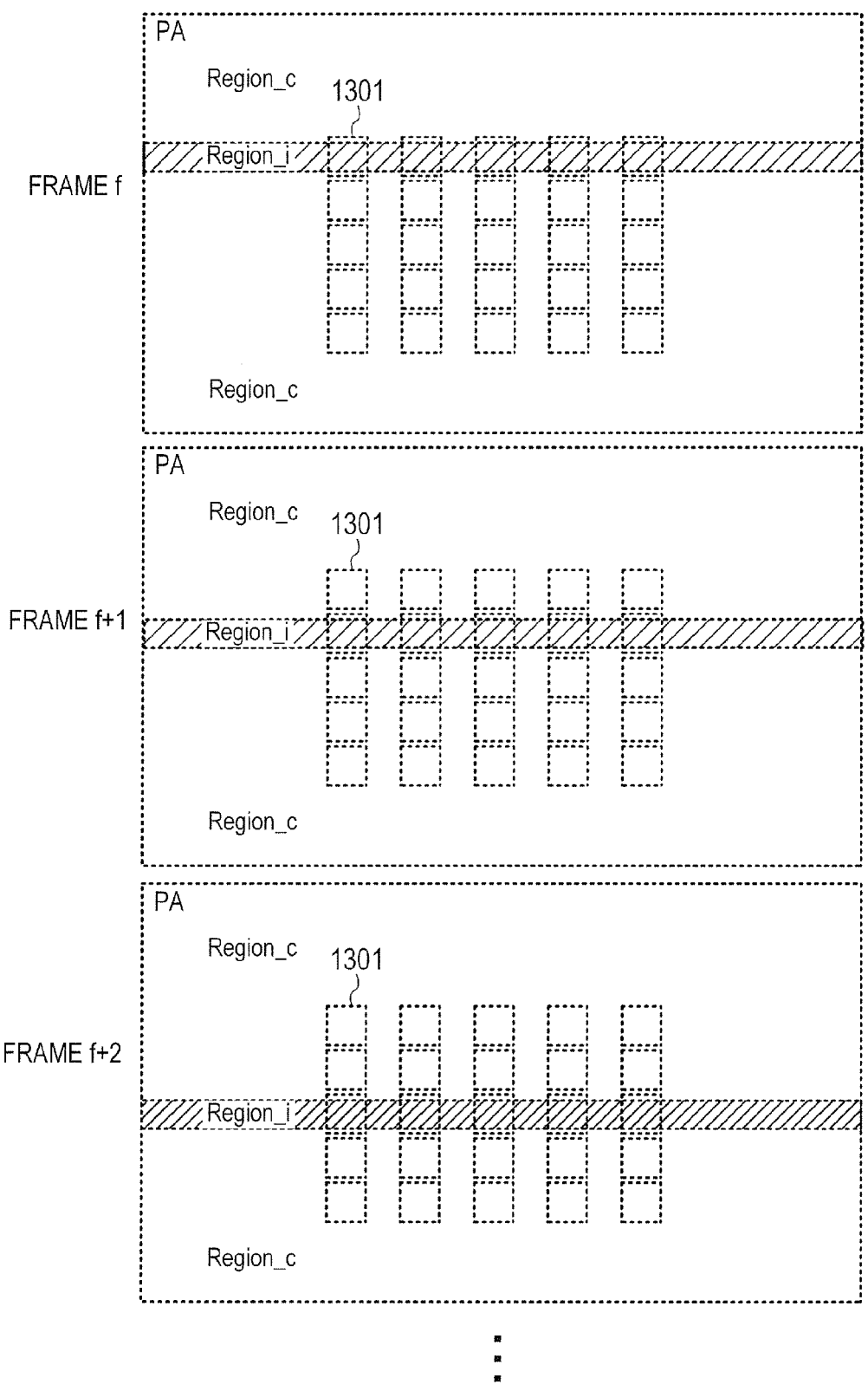
FIG. 13 is a diagram for illustrating setting of a focusing frame in an image pickup apparatus according to a second embodiment of the present invention.

In FIG. 13, the focusing frames 1301, which are set for acquiring the image signal A to carry out the AF calculation, are illustrated for each frame. In a frame f, the AF calculation is carried out only for the focusing frames 1301 corresponding to five focusing frames 801 in the uppermost stage among the 5×5 focusing frames 801 illustrating in FIG. 8. Therefore, the pixel signal is read out, assuming that a region corresponding to the uppermost stage of the five stages is the region Region_i and other regions are the regions Region_c.

Next, in a frame f+1, the AF calculation is carried out only for five focusing frames 1301 in the second stage from the top. Therefore, the pixel signal is read out assuming that a region corresponding to the second stage from the top is the region Region_i and other regions are the regions Region_c. The same is applied to a subsequent frame f+2. The target of the AF calculation is set to five focusing frames 1301 in the third stage from the top, and the pixel signal is read out assuming that a region corresponding to the third stage from the top is the region Region_i and other regions are the regions Region_c. As described above, by reading out the pixel signal from the pixel region PA while changing the position of the region Region_i for each frame, the AF calculation is carried out for 5×5=25 positions in five frames. Note that, when the region to carry out the AF calculation is limited depending on the object, and, for example, when the AF calculation is only required to be carried out for the five frames in the middle stage, the operation of the frame f+2 of FIG. 13 may be repeated in each frame. A setting mode in which a limited small number of focusing frames 1301 are set as the target of the AF calculation in one frame as described above is referred to as "limited frame focusing mode" herein, and a setting mode in which a large number of focusing frames are set as the target of the AF calculation in one frame as illustrated in FIG. 8 is referred to as "large-number frame focusing mode" herein.

The position of the region Region_i is designated and changed by issuing an instruction from the CPU 114 to the TG 113 and changing the drive signal for the image pickup element 106 generated from the TG 113.

In the limited frame focusing mode as in this embodiment, a small number of rows of the unit pixels 200 are positioned in the region Region_i, and hence as compared to a case of the large number frame focusing mode described in the first embodiment, the signal read-out time of the image pickup element 106 can be shortened. Therefore, according to this embodiment, the average power consumption can be suppressed or the frame rate can be increased.

Note that, the large-number frame focusing mode and the limited frame focusing mode may be switched in accordance with the image pickup mode, setting, focal state of the image pickup apparatus (camera), etc. For example, such a method of setting the limited frame focusing mode in a high frame-rate image pickup mode and setting the large-number frame focusing mode in a low frame-rate image pickup mode is conceivable.

Further, it is also conceivable to selectively carry out the large-number frame focusing mode and the limited frame focusing mode depending on the setting of a focusing mode (AF mode) of the image pickup apparatus. For example, the following method is conceivable. That is, the large-number frame focusing mode is used in such a mode that the focal position is determined while considering information of a plurality of focusing frames, and the limited frame focusing mode is used in such a mode that only an object in arbitrary one focusing frame is set in focus.

Alternatively, the following method is also conceivable. That is, first, the AF calculation is performed for a large number of frames in the large-number frame focusing mode, then one or a small number of focusing frames are selected based on the result, and thereafter the AF calculation is operated in the limited frame focusing mode.

This embodiment is described as if the number of lines per region Region_i is the same between the respective setting modes of the large-number frame focusing mode and the limited frame focusing mode, but as a matter of course, the number of lines may be changed in the respective modes. For example, in the large-number frame focusing mode, the regions Region_i with a small number of lines may be set in a plurality of areas, and in the limited frame focusing mode, the region Region_i with a large number of lines may be set in only one area. Further, when the position of the region Region_i or the number of lines per region Region_i are changed, the setting may be changed from the next reset scanning subsequent to the read-out scanning in the setting before change, to thereby obtain an image and focusing information after the setting change immediately in the next frame.

Third Embodiment

An image pickup apparatus according to a third embodiment of the present invention is described with reference to FIG. 14 and FIG. 15. Similar components as those of the image pickup apparatus according to the first or second embodiment illustrated in FIG. 1 to FIG. 13 are denoted by the same reference symbols to omit or simplify the description.

In the first and second embodiments, during the read-out scanning of the pixel signal in the region Region_i, the following operation is carried out. A time of 1H is taken for each of the read-out of the image signal A and the read-out of the image signal AB, and when the image signal A and the image signal AB are read out, a total time of 2H is taken. However, when the slit rolling operation is not carried out, the restriction of taking the time of 2H is not always necessary. For example, in a still image acquiring mode in which exposure is controlled by the mechanical shutter 120, no slit rolling operation is carried out. Therefore, in the region Region_i, the image signal A and the image signal AB can be read out in a shorter time than the time of 2H. Now, an example in which the read-out operation is changed between the still image acquiring mode and a moving image acquiring mode is described. The operation in the moving image acquiring mode is similar to the operations in the first and second embodiments described above, and hence description thereof is omitted herein.

Figure 14:
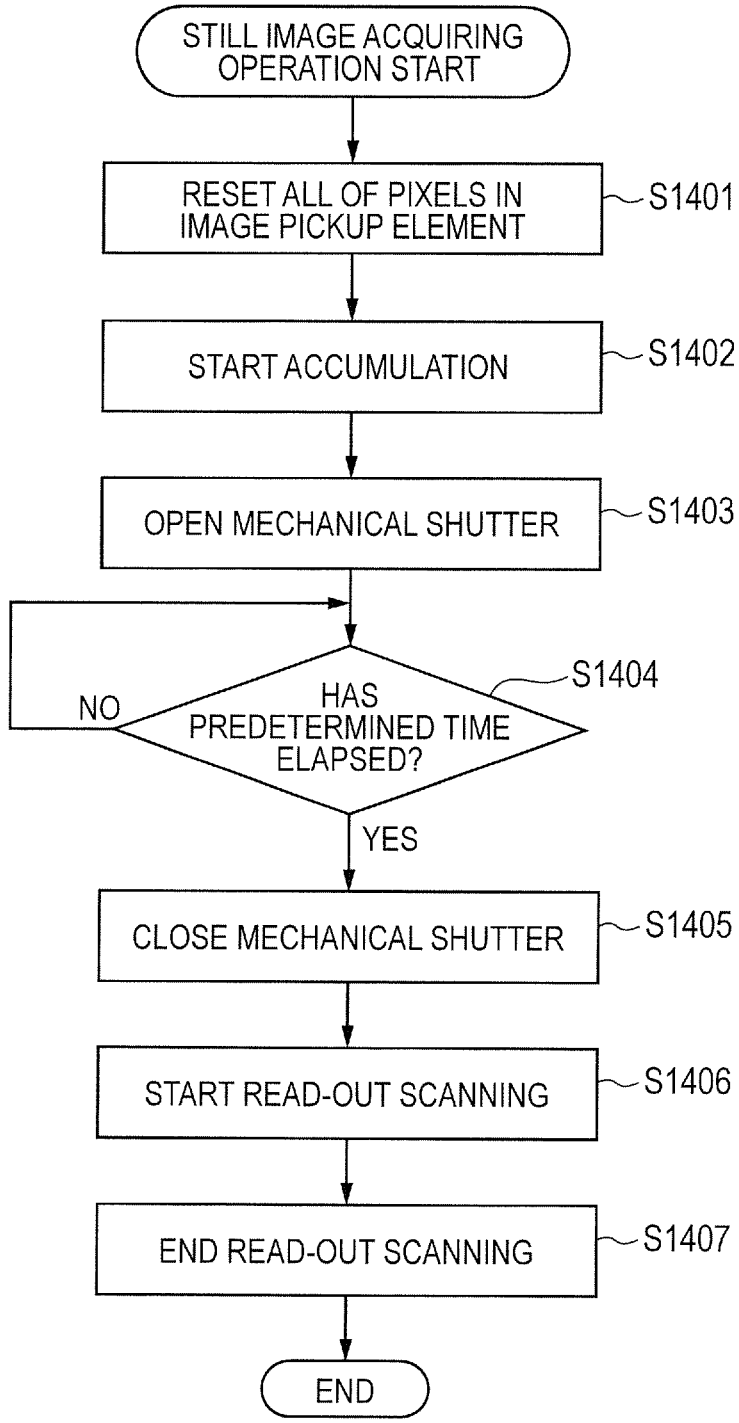
FIG. 14 is a flow chart of a still image acquiring operation in an image pickup apparatus according to a third embodiment of the present invention.

FIG. 14 is a flow chart of an image pickup mode of the image pickup apparatus in the still image acquiring mode. When the still image acquiring instruction is issued by the CPU 114, first, in Step S1401, all of the pixels of the image pickup element are reset. This operation is carried out by driving the signals res, txa, and txb to all of the pixels from the vertical scanning circuit 501.

When the vertical scanning circuit 501 sets the signals txa and txb to Low to turn off the transfer gates, charge accumulation of all of the pixels is started (Step S1402). After the charge accumulation is started, in Step S1403, the mechanical shutter 120 is set to an open state via the shutter driving circuit 121, to thereby start exposure to the image pickup element 106. The CPU 114 waits for elapse of a predetermined exposure time period in subsequent Step S1404. Then, in Step S1405, the mechanical shutter 120 is set to a closed state to end the exposure.

After the exposure is ended, the TG 113 is used to start the signal read-out from the image pickup element 106 (Step S1406). After the read-out of the final line is completed in Step S1407, the still image acquiring operation is ended.

As described above, in the still image acquisition, the optical signal charges of the image pickup element 106 are controlled through exposure control of the mechanical shutter. Therefore, even when the accumulation time of the image pickup element 106 differs in each pixel (each line), the image is hardly affected, and the slit rolling operation is unnecessary.

Figure 15:
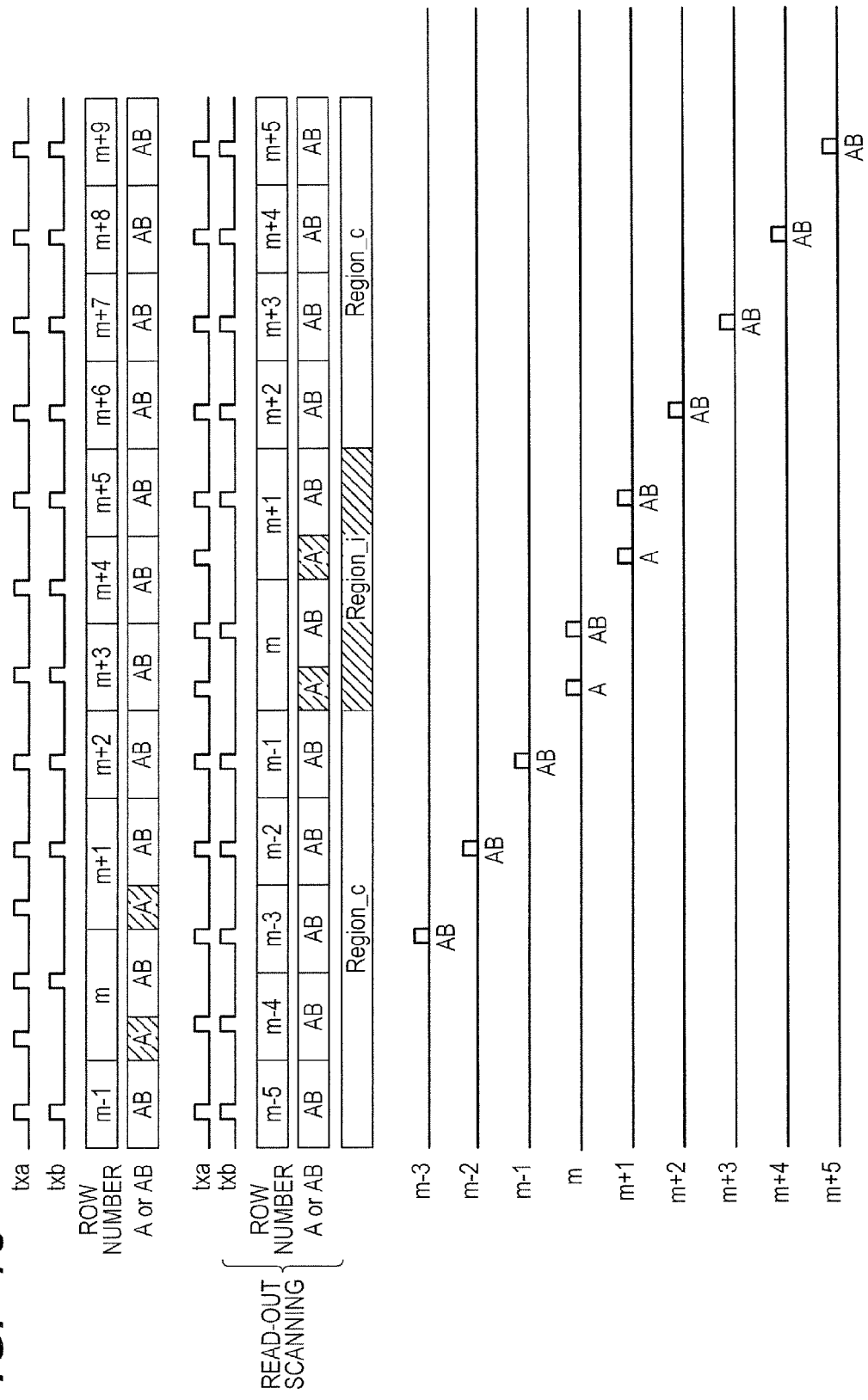
FIG. 15 is a timing chart of a read-out operation in the still image acquiring operation in the image pickup apparatus according to the third embodiment of the present invention.

FIG. 15 is an illustration of the read-out operation during the still image acquisition. The operation is not the slit rolling operation, and hence the reset scanning is unnecessary (in S1401, the pixels are reset). In the read-out operation for the region Region_i, it is unnecessary to match both of the times for read-out of the image signal A and read-out of the image signal AB to 1H, and each read-out and scanning are carried out with a minimum required time.

With the above-mentioned configuration, during the slit rolling operation in the moving image acquiring mode, an image without an exposure amount difference can be acquired while carrying out the focus detection operation. In addition, even during the still image acquiring mode, an image can be acquired with a minimum read-out time while carrying out the focus detection operation. Note that, the method of this embodiment may be applied to the second embodiment.

Fourth Embodiment

An image pickup apparatus according to a fourth embodiment of the present invention is described with reference to FIG. 16 to FIG. 17B. Similar components as those of the image pickup apparatus according to the first to third embodiments illustrated in FIG. 1 to FIG. 15 are denoted by the same reference symbols to omit or simplify the description.

The first embodiment to the third embodiment are described assuming that the image signal A and the image signal AB are read out in the region Region_i. Alternatively, a configuration of reading out the image signal A and the image signal B is conceivable. In this embodiment, the configuration of this case is proposed. Note that, the configuration of the image pickup apparatus in this embodiment is similar to that in the first embodiment regarding the configuration illustrated in FIG. 1 to FIG. 8, and hence description thereof is omitted herein. This embodiment differs from the first embodiment in the configuration of reading out the image signal A and the image signal B in the region Region_i, and hence only this configuration is described herein.

Figure 16:
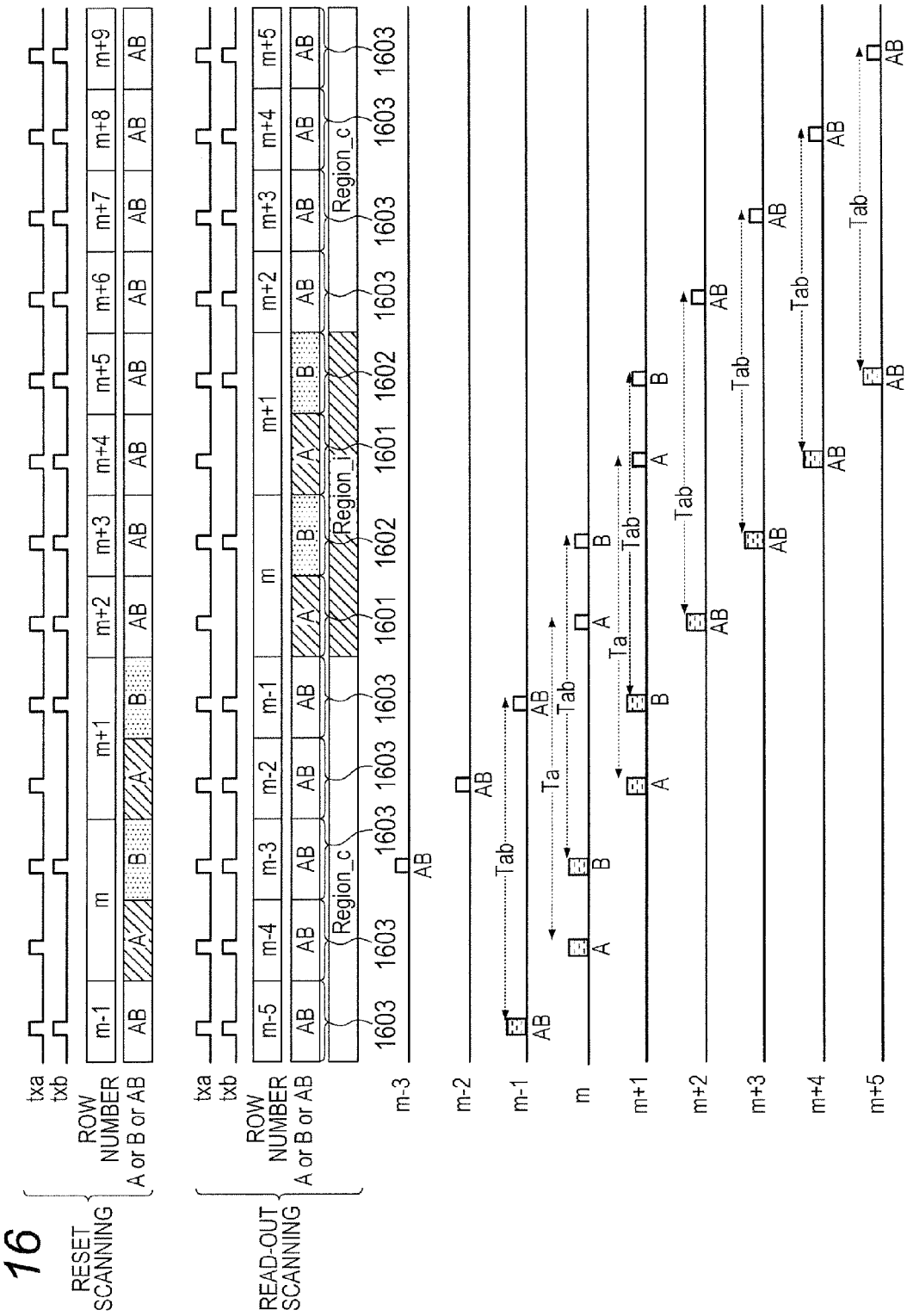
FIG. 16 is a timing chart of a slit rolling operation in an image pickup apparatus according to fourth embodiment of the present invention.

FIG. 16 is a timing chart of the slit rolling operation according to this embodiment. The operation for rows other than the m-th row and the (m+1)th row corresponding to the region Region_i is similar to that described with reference to FIG. 10. During the read-out scanning for the region Region_i, first, the PD 601a (image signal A) is read out, and subsequently the next PD 601b (image signal B) is read out. The same is applied also to the reset scanning.

The m-th row and the (m+1)th row are positioned in the region Region_i. The (m−5)th row to the (m−1)th row and the (m+2)th row to the (m+5)th row are positioned in the regions Region_c. The length of a read-out period 1601 of the image signal A in each of the m-th row and the (m+1)th row is 1H. Further, the length of a read-out period 1602 of the image signal B in each of the m-th row and the (m+1)th row is 1H. The length of a read-out period 1603 of the image signal AB in each of the (m−5)th row to the (m−1)th row and the (m+2)th row to the (m+5)th row is 1H.

When the read-out is carried out for the unit pixels 200 positioned in the m-th row and the (m+1)th row, the image signal A is read out during the read-out period 1601, and the image signal B is read out during the read-out period 1602. Therefore, during the read-out period 1601, the charges accumulated in the PD 601a are transferred to the FD portion 603, and during the read-out period 1602, the charges accumulated in the PD 601b are transferred to the FD portion 603.

Further, when the read-out is carried out for the unit pixels 200 positioned in the (m−5)th row to the (m−1)th row and the (m+2)th row to the (m+5)th row, during each read-out period 1603, the image signal AB is read out. Therefore, during the read-out period 1603, the charges accumulated in the PD 601a and the charges accumulated in the PD 601b are transferred to the FD portion 603.

During the read-out period 1603, a first mode is applied, which is a mode in which the signals corresponding to the charges generated in the PD 601a and the PD 601b are subjected to synthesis processing, and the signals subjected to the synthesis processing are read out.

Further, during the read-out period 1601, a second mode is applied, which is a mode in which the signal corresponding to the charges generated in the PD 601a is read out without synthesis processing.

Further, during the read-out period 1602, a mode different from the second mode applied during the read-out period 1601 is applied. In this embodiment, a third mode is applied during the read-out period 1602, which is a mode in which the signal corresponding to the charges generated in the PD 601b is read out without synthesis processing.

Figure 17A:
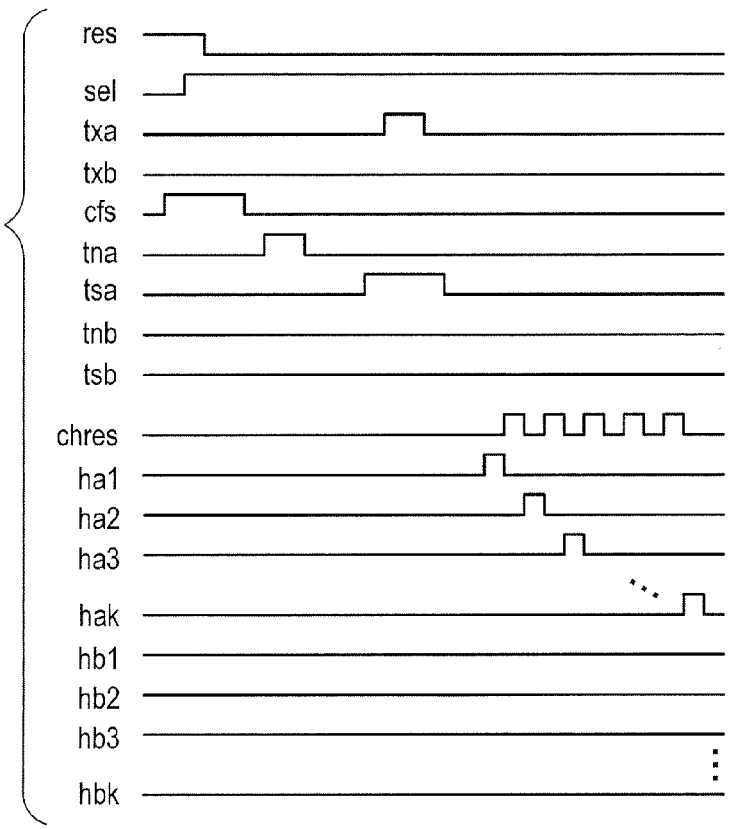
FIGS. 17A and 17B are timing charts of a read-out operation for a unit pixel row of an image pickup element in the image pickup apparatus according to the fourth embodiment of the present invention.

A timing chart for 1H during read-out of the image signal A is illustrated in FIG. 17A. FIG. 17A differs from FIG. 9B only in that, during read-out of the noise signal N, the signal tnb is not set to High, and the noise signal N is not stored in the second N-signal holding capacitor 712.

Figure 17B:
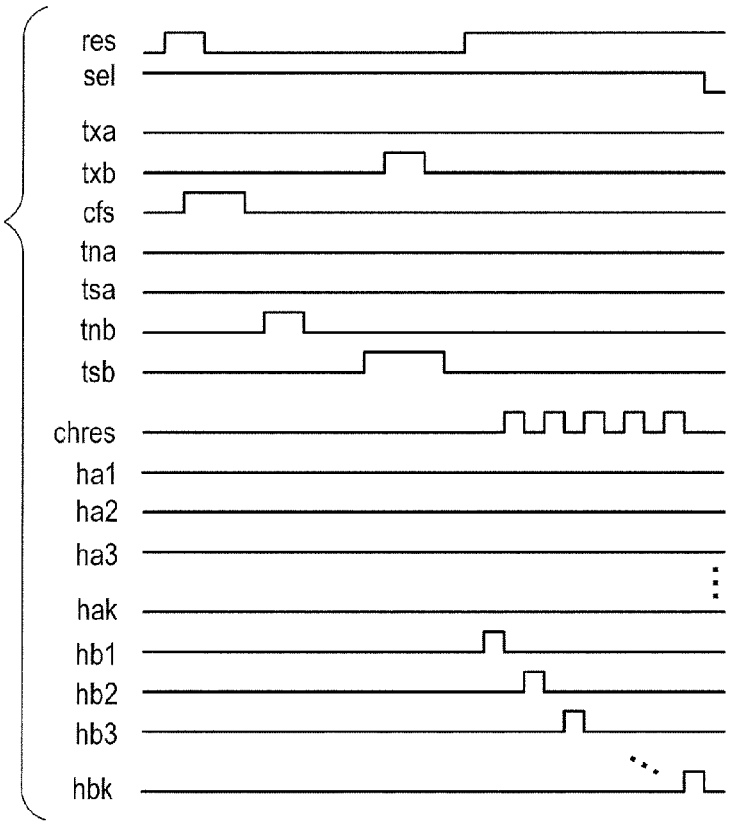

Next, a timing chart for 1H during read-out of the image signal B is illustrated in FIG. 17B. FIG. 17B differs from FIG. 9C in that, first, the signal res is once set to High level to reset the FD portion 603, the signal cfs is set to High level to set the operational amplifier 703 to a buffer state, and next the signal tnb is set to High level to store the noise signal N in the second N-signal holding capacitor 712.

For image generation, the image signal AB of the region Region_i is necessary, but this image signal AB may be generated by adding the image signal A and the image signal B to each other in the DSP 109. Further, the method of this embodiment may be applied to the second embodiment and the third embodiment.

In this embodiment, there is an advantage in that, unlike the case of the first embodiment illustrated in FIG. 10, the accumulation time of the image signal A and the accumulation time of the image signal B are the same, and gain correction for matching the levels is unnecessary.

According to the embodiments of the present invention described above, it is possible to provide the image pickup apparatus and the method for controlling the same, which are capable of obtaining a satisfactory image quality with less exposure amount difference while suppressing increase in read-out time for acquiring signal for focus detection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non -transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Modified Embodiments

The present invention is not limited to the above-mentioned embodiments, and various modifications may be made thereto.

For example, in the above-mentioned embodiments, an example of a case where two sub-pixels a and b are arranged in one unit pixel 200 is described, but the number of sub-pixels to be arranged in one unit pixel 200 is not limited to two, and may be appropriately set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-125494, filed Jun. 18, 2014, and Japanese Patent Application No. 2015-103467, filed May 21, 2015, which are hereby incorporated by reference herein in their entirety.

What is claimed is:

1. An image sensor, comprising
a plurality of pixels arrayed in a row direction and a column direction and including a first photoelectric converter and second photoelectric converter respectively; and
a driver that supplies drive signals to the respective switches via common lines for the row direction or the column direction and drives the plurality of pixels by predetermined mode to output signals from the plurality of pixels included in a predetermined region,
wherein the predetermined mode includes a first mode that is a mode in which first signals corresponding to charges generated in the first photoelectric converter and the second photoelectric converter are read out for image signals, and a second mode that is a mode in which second signals corresponding to the charges generated in the first photoelectric converter are read out without combining with the charges generated in the second photoelectric converter,
wherein the driver read out a first number of the first signals in the predetermined region during a first read-out period and a second number, which is substantially same the first number, of the second signals in the predetermined region during second read-out period different from the first read-out period.

2. The image sensor according to claim 1,
wherein the driver drives the plurality of pixels in the predetermined region by the second mode and the first mode successively, and
wherein the charges are transferred from the first photoelectric converter to a floating diffusion during the first read-out period, and the charges are transferred from the second photoelectric converter to the floating diffusion during the second read-out period.

3. The image senor according to claim 1,
wherein the predetermined region are formed by at least one of rows that include the plurality of pixels.

4. The image sensor according to claim 3,
wherein the predetermined region are formed by at least one of rows that include the plurality of pixels.

5. The image sensor according to claim 1,
wherein the driver is configured to employ a first setting mode in which a limitation is added to setting of the predetermined region, and a second setting mode in which no limitation is added to the setting of the predetermined region.

6. The image sensor according to claim 5,
wherein the predetermined region corresponds to a focusing frame for detecting an in-focus state, and
wherein the driver is configured to switch between the first setting mode and the second setting mode in accordance with one of an image pickup mode and a focusing mode of the image pickup apparatus, the image pickup mode including a high frame-rate image pickup mode and a low frame-rate image pickup mode, the focusing mode including a focusing mode using a plurality of the focusing frames and a focusing mode using one focusing frame.

7. The image sensor according to claim 1
wherein the image sensor is configured to employ a moving image acquiring mode that is a mode for acquiring a moving image, and a still image acquiring mode that is a mode for acquiring a still image, and
wherein, in the still image acquiring mode, the processor sets the length of the second read-out period to be shorter than the length of the first read-out period.

8. The image sensor according, to claim 1,
wherein the predetermined region comprises a plurality of first regions set a vertical direction of the pixel region, and
wherein a number of rows of the plurality of unit pixels included in one of the plurality of first regions differs from a number of rows of the plurality of unit pixels included in another of the plurality of first regions.

9. The image sensor according to claim 1,
wherein a length of the first read-out period is a length of one unit read-out time.

10. The image sensor according, to claim 1,
wherein a length of read-out time of each row included in the predetermined region is substantially twice as a length of read-out time of each row not included in the predetermined region.

11. The image sensor according to claim 1,
wherein the predetermined mode includes a reset scan mode that is a reset mode in which charges generated in the first photoelectric converter the second photoelectric converter are subjected to reset in each row of the pixel region,
wherein the reset scan mode includes a rolling reset mode in which a plurality of rows of the pixel region are reset sequentially and a global reset mode in which a plurality of rows of the pixel region are reset simultaneously.

12. An image pickup apparatus, comprising:
the image sensor including:
   a plurality of pixels arrayed in a row direction and a column direction, and including a first photoelectric converter and a second photoelectric converter respectively; and
   a driver that supplies drive signals to the respective switches via common lines for the row direction or the column direction and drives the plurality of pixels by predetermined mode to output signals from the plurality of pixels included in a predetermined region,
   wherein the predetermined mode includes a first mode that is a mode in which first signals corresponding to charges generated in the first photoelectric converter and the second photoelectric converter are read out for image signals, and a second mode that is a mode in which second signals corresponding to the charges generated in the first photoelectric converter are read out without combining with the charges generated in the second photoelectric converter,
   wherein the driver read out a first number of the first signals in the predetermined region during a first read-out period and a second number, which is substantially same as the first number, of the second signals in the predetermined region during a second read out period different from the first read-out period, and
   a processor that carries out focus detection based on a signal read out in the first mode from a first unit pixel among the plurality of unit pixels and a signal read out in the second mode from the first unit pixel.

13. The image pickup apparatus according to claim 12, further comprising:
a setting unit configured to set the predetermined region as a focus detecting region.

14. The image pickup apparatus according to claim 13,
wherein, when the setting of the focus detecting region is changed by the setting unit, the driver changes the setting from reset scanning of each row in the predetermined region.

15. The image sensor according to claim 12,
further comprising gain correction unit configured to correct signal levels of the respective rows to be matched the accumulation time difference with each other.

16. A control method of image sensor,
the image sensor including:
   a plurality of pixels arrayed in a row direction and a column direction, and including a first photoelectric converter and a second photoelectric converter respectively; and
   a driver that drives the plurality of pixels by predetermined mode to output signals from the plurality of pixels included in a predetermined region,
   wherein the predetermined mode includes a first mode that is a mode in which first signals corresponding to charges generated in the first photoelectric converter and the second photoelectric converter are read out for image signals, and a second mode that is a mode in which second signals corresponding to the charges generated in the first photoelectric converter are read out without combining with the charges generated in the second photoelectric converter,
the control method comprising:
reading out a first number of the first signals in the predetermined region during a first read-out period; and
reading out a second number, which is substantially same as the first number, of the second signals in the predetermined region during second read-out period different from the first read-out period.

* * * * *